US012456348B2

(12) United States Patent
Kuhlmann et al.

(10) Patent No.: US 12,456,348 B2
(45) Date of Patent: Oct. 28, 2025

(54) METHOD AND SYSTEM FOR PROVIDING SYMBOL-BASED EVENTS HAVING PERSONAL BANK FEATURES FOR PROGRESSIVE AWARDS

(71) Applicant: Spinplay Holdings Limited, St Peter Port (GG)

(72) Inventors: Michael Anton Kuhlmann, Henderson, NV (US); Serena Petersen, Henderson, NV (US)

(73) Assignee: Spinplay Holdings Limited, St Peter Port (GG)

( * ) Notice: Subject to any disclaimer, the term of this patent is extended or adjusted under 35 U.S.C. 154(b) by 370 days.

(21) Appl. No.: 17/932,233

(22) Filed: Sep. 14, 2022

(65) Prior Publication Data

US 2024/0087411 A1 Mar. 14, 2024

(51) Int. Cl.
*G07F 17/32* (2006.01)
*G07F 17/34* (2006.01)

(52) U.S. Cl.
CPC ...... *G07F 17/3258* (2013.01); *G07F 17/3211* (2013.01); *G07F 17/3267* (2013.01); *G07F 17/34* (2013.01)

(58) Field of Classification Search
CPC ............. G07F 17/3258; G07F 17/3211; G07F 17/3267; G07F 17/34
See application file for complete search history.

(56) References Cited

U.S. PATENT DOCUMENTS

| | | | | |
|---|---|---|---|---|
| 9,033,793 | B2 | 5/2015 | Torres | |
| 10,482,712 | B2 | 11/2019 | Link et al. | |
| 12,033,472 | B2 * | 7/2024 | Chesworth | G07F 17/3267 |
| 2018/0089960 | A1 | 3/2018 | Caputo et al. | |
| 2020/0402362 | A1 | 12/2020 | De Waal et al. | |

FOREIGN PATENT DOCUMENTS

| | | | |
|---|---|---|---|
| AU | 2012203136 | B2 | 6/2012 |
| WO | 03/067534 | A1 | 8/2003 |

* cited by examiner

*Primary Examiner* — Reginald A Renwick
(74) *Attorney, Agent, or Firm* — McDonnell Boehnen Hulbert & Berghoff LLP

(57) ABSTRACT

Systems, methods, and storage media for providing symbol-based events having personal bank features for progressive awards are disclosed. Example implementations may: output a graphical user interface to a display of a computing system configured to perform a symbol-based event; determine a trigger event corresponding to a user accessing the symbol-based event at the computing system; output, to the display a first update to the GUI, the first update based on a personal bank value corresponding to the user; determine, in response to a first activation request, a first result of performing a first instance of the symbol-based event; and output, to the display in response to the first activation request, a second update to the GUI.

20 Claims, 14 Drawing Sheets

METHOD AND SYSTEM FOR PROVIDING SYMBOL-BASED EVENTS HAVING PERSONAL BANK FEATURES FOR PROGRESSIVE AWARDS

FIELD

This disclosure relates to software-based wagering events including symbol-based events having personal bank features for progressive rewards.

BACKGROUND

Slot machines come in a variety of forms, including for example a mechanical slot machine. A mechanical slot machine can include one or more reels, each of which includes multiple symbols distributed around the circumference of the reel. When a slot machine with reel(s) is used, a user is allowed to spin the reels. Each reel then comes to rest, typically with either one of the symbols, or a space in between symbols, in alignment with a payline. A predefined winning symbol or a predefined combination of winning symbols that are aligned with the payline can result in the user receiving an award. In one example, the slot machine can include three reels, and the payline can be an imaginary, horizontal line disposed across a central portion of a window through which a portion of each of the three reels is visible.

As another example, a mechanical slot machine can present symbols in a matrix arrangement, with each symbol changing during a use of the mechanical slot machine. For example, the mechanical slot machine can have five columns and three rows of symbols, for a total of fifteen symbols. Such mechanical slot machines often have multiple pay lines, each being defined by a collection of positions within the matrix. For example, the mechanical slot machine can have three pay lines, each corresponding to one row of the matrix.

While slot machines were traditionally mechanical, modern slot machines often take the form of a computing system (e.g., a dedicated computing system located in a casino) that includes a graphical user interface (GUI), and that can emulate a mechanical slot machine. Despite such advances, there is a continuing need to improve how a computing system simulates a mechanical slot machine.

Overview

The present application discloses embodiments including and/or related to systems, methods, and apparatus that provide improvements in computer-implemented technology by increasing the number and variety of possible outcomes based on a random selection of symbols, such as symbols that can be found on a mechanical slot machine.

In a first aspect, a computing system is provided. The computing system includes a processor configured by machine-readable instructions to: output a graphical user interface to a display of a computing system configured to perform a symbol-based event; determine a trigger event corresponding to a user accessing the symbol-based event at the computing system; output, to the display a first update to the GUI, the first update based on a personal bank value corresponding to the user; determine, in response to a first activation request, a first result of performing a first instance of the symbol-based event, the first result indicating whether to change the personal bank value based on a set of symbols selected for the first instance of the symbol-based event; and output, to the display in response to the first activation request, a second update to the GUI, the second update including at least the first result of performing the first instance of the symbol-based event.

In a second aspect, a method is provided. The method can include outputting a graphical user interface to a display of a computing system configured to perform a symbol-based event. The method can include determining a trigger event corresponding to a user accessing the symbol-based event at the computing system. The method can include outputting, to the display a first update to the GUI, the first update based on a personal bank value corresponding to the user. The method can include determining, in response to a first activation request, a first result of performing a first instance of the symbol-based event. The first result can indicate whether to change the personal bank value based on a set of symbols selected for the first instance of the symbol-based event. The method can include outputting, to the display in response to the first activation request, a second update to the GUI. The second update can include at least the first result of performing the first instance of the symbol-based event.

In a third aspect, a computer-readable memory is provided. The computer-readable memory has stored therein instructions executable by a processor to cause a computing system to perform functions. The functions include outputting a graphical user interface to a display of a computing system configured to perform a symbol-based event. The functions include determining a trigger event corresponding to a user accessing the symbol-based event at the computing system. The functions include outputting, to the display a first update to the GUI, the first update based on a personal bank value corresponding to the user. The functions include determining, in response to a first activation request, a first result of performing a first instance of the symbol-based event. The first result can indicate whether to change the personal bank value based on a set of symbols selected for the first instance of the symbol-based event. The functions include outputting, to the display in response to the first activation request, a second update to the GUI. The second update can include at least the first result of performing the first instance of the symbol-based event.

These aspects, as well as other embodiments, aspects, advantages, and alternatives will become apparent to those of ordinary skill in the art by reading the following detailed description, with reference where appropriate to the accompanying drawings. Further, this overview and other descriptions and figures provided herein are intended to illustrate embodiments using examples only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The above, as well as additional, features will be better understood through the following illustrative and non-limiting detailed description of example embodiments, with reference to the appended drawings.

Figure 1A:
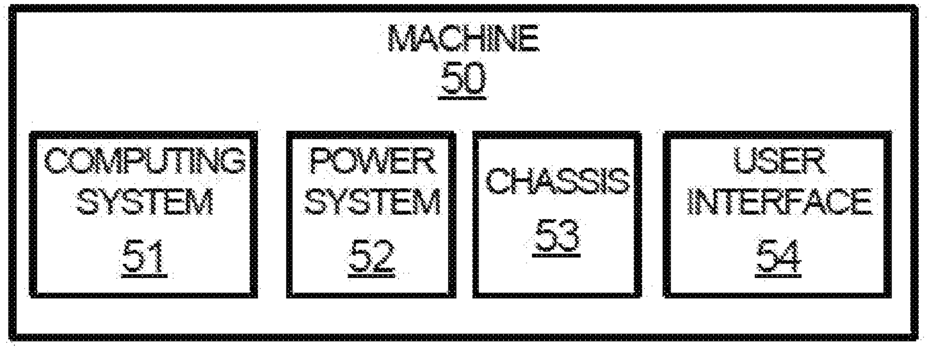
FIG. 1A is a block diagram of a machine, in accordance with the example embodiments.

All the figures are schematic, not necessarily to scale, and generally only show parts which are necessary to explain example embodiments, wherein other parts can be omitted or merely suggested.

DETAILED DESCRIPTION

I. Introduction

In this detailed description, several example embodiments are disclosed including, but not limited to, embodiments pertaining to performing aspects of an outcome event using a computing system (e.g., a server and/or a client computing system), a user device and/or a machine. The user device and/or the machine can be configured as and/or include a computing system. For purposes of this description, unless the context dictates otherwise, a user device or machine can include and/or be embodied as a computing system.

A computing system and/or a display screen of the computing system can display a variety of symbols during performance of an outcome event. The symbols displayed on the display and/or data corresponding to the displayed symbols can be used to determine an award for a winning outcome. A winning outcome can be based on symbols being displayed according to a pattern of symbols (e.g., a predefined pattern of symbols). The pattern can be defined as a payline of a line-type outcome event, or a payway of a ways-type outcome event. Unless the context of the specification dictates otherwise, an embodiment in which outcomes are based on paylines and/or a line-type outcome event, can instead be based on payways and/or a ways-type outcome event, and vice versa.

In a line-type outcome event, each payline is a pattern on reels or a matrix. The payline typically starts from a left-most reel and passes through adjacent reels until the payline reaches the right-most reel. The quantity of paylines active for a line-type outcome event can depend upon a payment and/or a selection made to perform the line-type outcome event.

In a ways-type outcome event, each payway includes a combination of matching symbols located on adjacent reels. The symbols can be in any position on one of the adjacent reel. As an example, for outcome events performed on a computing system having a display screen, the outcome events can be arranged with five reels and three rows such that there are 243 payways with three or more symbols possible. The quantity of payways active for a ways-type outcome event can depend upon a payment and/or selection made to perform the ways-type outcome event.

In accordance with the example embodiments, a pattern that results in an award can include a particular pattern that starts at either side of a symbol-display portion of a display (e.g., a left side or a right side). For example, in an embodiment in which the symbol-display portion includes a respective reel in five columns referred to as C1, C2, C3, C4, C5 as those columns are arranged from a left side of the symbol-display portion to a right side of the symbol portion, the particular pattern (e.g., a payline or payway) can include a pattern with a sufficient quantity and kind of symbols starting at column C1, or a pattern with a sufficient quantity and kind of symbols starting at column C5. For instance, if the sufficient quantity and kind of symbols equals three "K" symbols, then a pattern of "K" symbols in columns C1, C2, C3 or in columns C5, C4, C3 results in an award. Moreover, in some embodiments, a special symbol, such as a "Wild" symbol can take the place of the kind of symbol defined for the particular pattern. Other examples of the sufficient quantity and kind of symbols are possible.

Some of the described embodiments refer to multiple patterns (e.g., multiple particular patterns). In one respect, the multiple particular patterns can be multiple particular paylines. In another respect, the multiple particular patterns can be multiple particular payways. Moreover, a particular pattern can be a particular payline or a particular payway. Furthermore, a winning pattern can be a winning payline or a winning payway. Furthermore still, a horizontally extending pattern can be a horizontally extending payline or a horizontally extending payway. Similarly, a diagonally extending pattern can be a diagonally extending payline or a diagonally extending payway.

Moreover, displaying the symbols can include displaying an image of one or more reels or a matrix, together with animation effects to simulate a spin of the one or more reels, or a spin of the columns or rows of the matrix. A computer software program, which can reside in the computing system, can randomly select one or more symbols in response to a spin, and can display the selected one or more symbols on the display.

Additionally, an outcome event can be performed over a computer-network, such as by a user using a client computing system that is connected to a server computing system over the computer-network. In this instance, the server computing system can cause the reels to spin and can send the resulting symbols to the client computing system for display.

Throughout this description, the articles "a" or "an" are used to introduce elements of the example embodiments. Any reference to "a" or "an" refers to "at least one" or "one or more," and any reference to "the" refers to "the at least one" or "the one or more," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures can be used in combination with one another. Thus, the figures should be generally viewed as component aspects of one or more overall embodiments, with the understanding that not all illustrated features are necessary for each embodiment.

The systems, methods, and apparatus described in this description can carry out aspects of an outcome event that includes displaying symbols. These aspects can be incorporated into outcome events, in particular, outcome events performed in response to a payment. In one aspect, the systems, methods, and apparatus provide features that can enhance traditional outcome events (e.g., slot machines or other reel-type outcome events) by providing a user with additional opportunities to win the outcome event, thereby increasing the user's interest, anticipation, and excitement in connection with the outcome event. This can in turn benefit a casino or another entity that provides an outcome event with this feature. Indeed, outcome events are typically configured to have odds that favor the casino (sometimes referred to as the "house"). Accordingly, based on the law of averages, casinos often increase their profits simply by getting more users to use its computing system to perform more outcome events. Due to the provided features, users can be drawn in (e.g., from competing casinos that lack outcome events with such features) and they can perform the outcome event often. The features can include data communications between a server computing system and a client computing system within a server-client based configuration.

II. Example Architecture

FIG. 1A is a block diagram of a machine 50 in accordance with the example embodiments. The machine 50 includes a computing system 51, a power system 52, a chassis 53, and/or a user interface 54. The machine 50 can be configured to perform a method or at least some functions of a method according to the example embodiments. In at least some embodiments, the computing system 51 can include at least a portion of one or more from among: the power system 52, the chassis 53, or the user interface 54.

The computing system 51 can include a processor and a memory storing program instructions executable by the processor to perform a method or at least some functions of a method according to the example embodiments. As an example, the computing system 51 can be arranged as and/or include components of any computing system described in this description and/or shown in the drawings. In particular, the computing system 51 can be arranged as and/or include components of a computing system 100 shown in FIG. 1B, a computing system 100*a* shown in FIG. 2, a computing system 100*b* also shown in FIG. 2, or a computing system 1000 shown in FIG. 10.

The power system 52 includes means for powering some portion of the machine 50, such as the computing system 51 and/or the user interface 54. The power system 52 can include a power supply, such as a battery, a generator, a fuel cell, or a solar cell, or some other type of power supply instead or in addition. The power system 52 can include a power circuit for distributing electrical power throughout the machine 50 where needed. The power system 52 can include a connector and/or connection for connecting to another power system, such as a power system within a building and/or a power system of an electrical utility company.

The chassis 53 includes means for supporting and/or protecting other aspects of the machine 50. As an example, the chassis 53 can include a rack for supporting at least portions of the computing system 51, the power system 52, and/or the user interface 54. As another example, the chassis 53 can include a housing in which at least portions of the computing system 51, the power system 52, and/or the user interface 54 reside.

The user interface 54 can include one or more user interface input components configured to receive and/or produce content (e.g., a signal, data, and/or information) based on some action of a user. That content can be provided to the computing system 51. The user interface 54 can include one or more user interface output components for outputting content. That content can be provided by the computing system 51. The user action can occur by use of the user interface 54.

In at least some embodiments, the user interface 54 includes a mechanical user interface input component, such as an arm, handle or lever located on a side of the chassis 53 similar to an arm, handle, or lever located on a mechanical slot machine. As an example, the mechanical user interface input component can be configured to input a spin request to the computing system 51.

In at least some embodiments, the user interface 54 includes an acceptor, such as a paper money acceptor, a coin acceptor, a token acceptor, a validator, and/or a card reader.

In at least some embodiments, the computing system 51 includes at least a portion of the user interface 54. As an example, in embodiments in which the computing system 51 is arranged like the computing system 100, the computing system 100*a*, or the computing system 100*b*, the user interface 54 can be arranged like the user interface 104, the user interface 104*a*, or the user interface 104*b*, respectively.

Figure 1B:
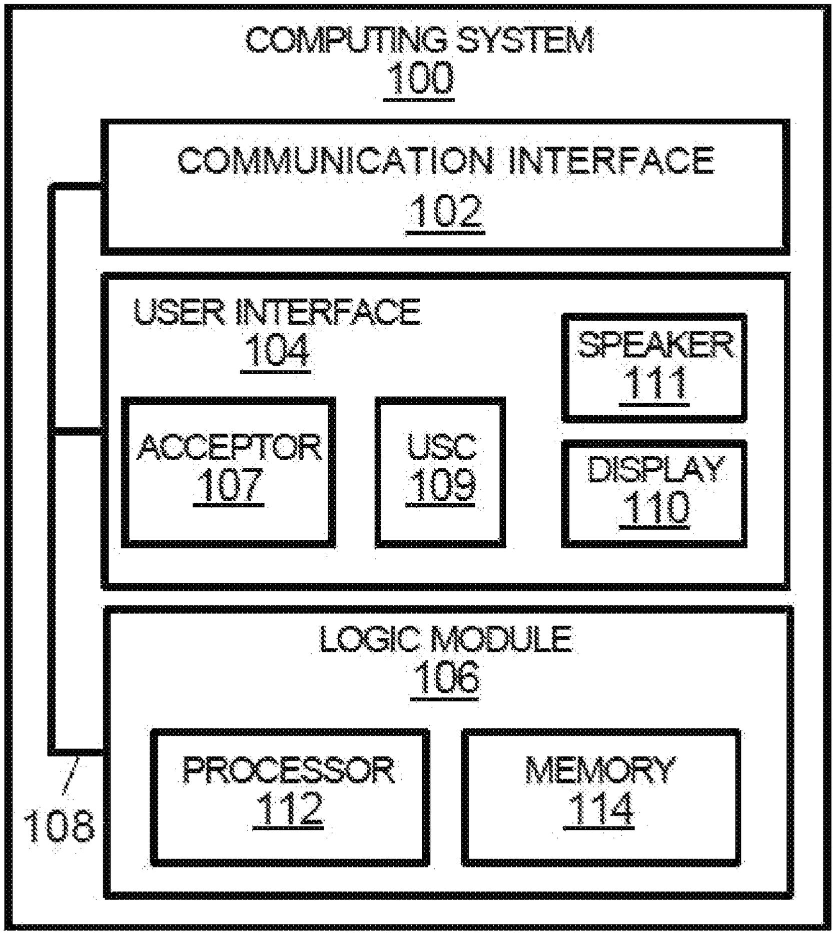
FIG. 1B is a block diagram of a computing system, in accordance with the example embodiments.

Next, FIG. 1B is a block diagram of a computing system 100 in accordance with the example embodiments. The computing system 100 can be arranged as and/or include a stand-alone computing system, a distributed computing system, a personal computer, a server computing system, a client computing system, a portable computing system, a mobile phone, a smartphone, a tablet device, or some other computing device. The computing system 100 can be referred to as a user device.

The computing system 100 can include a communication interface 102, a user interface 104, and a logic module 106, two or more which can be coupled together by a system bus, network, or other connection mechanism 108. The communication interface 102 can include a wired or wireless network communication interface. For purposes of this description, any data described as being provided, sent, or transmitted by the computing system 100 can be data sent by the communication interface 102 over a communication network. In addition, for purposes of this description, any data described as being received by the computing system 100 can be data sent to communication interface 102 over a communication network.

The user interface 104 includes components that can facilitate interaction with a user of the computing system 100. For example, the user interface 104 can include user interface output components, such as a display 110 and/or a speaker 111. As another example, the user interface can include user interface input components, such as an acceptor 107, a user-selectable control 109 (e.g., a keypad, a keyboard, or a mouse), or a touch-sensitive screen. The touch-sensitive screen can be part of the display 110, such that the display 110 is operable as both a user interface input component and a user interface output component. The user-selectable control 109 can include one or more user-selectable controls, one or more of which can be implemented on the touch sensitive screen (which can also be referred to as a touch pad).

The display 110 is configured to display (i.e., visually present and/or show) content. As an example, the content can correspond to an outcome event, such as a set of symbols selected for the outcome event, a matrix, a reel, a payline, a payway, an award, an instruction, or a user-selectable control (e.g., a button). As another example, the content can include text, a graphic, a GUI, an animation, a video, or some other content as well or instead. As yet another example, the content can include content shown in and/or described with respect to any of FIG. 6A, FIG. 6B, FIG. 6C, FIG. 6D, FIG. 6E, FIG. 7, FIG. 8, FIG. 9, FIG. 10, FIG. 11A, FIG. 11B, FIG. 11C, FIG. 11D, FIG. 11E, and/or FIG. 11F. The display 110 can include a display screen (e.g., a display panel or a graphical display unit) including a quantity of pixels (e.g., 786,432 pixels in an array of pixels that is 1,024 pixels by 768 pixels). Other examples of an array of pixels are possible.

Additionally, the display 110 and/or the display screen can include and/or be arranged as a liquid crystal display (LCD), a light emitting diode (LED) display, an organic LED (OLED) display, a plasma display or some other type of display. Furthermore, the display 110 can embody the touch sensitive screen noted above such that the display 110 and/or display screen includes and/or is arranged as a touch screen display.

The logic module 106 can include and/or be arranged as a processor 112 and/or a memory 114. The processor 112 can include a general-purpose processor (e.g., a microprocessor) or a special-purpose processor (e.g., a graphics process, a digital signal processor or an application specific integrated circuit) and can be integrated in whole or in part with the communication interface 102 or the user interface 104. Any memory discussed in this description or shown in the drawings can be referred to as a computer-readable memory, data storage, computer-readable data storage, among other names.

The memory 114 can include volatile or non-volatile storage components and can be integrated in whole or in part with the processor 112. The memory 114 can take the form of a non-transitory computer-readable medium and can include software program instructions, that when executed by the processor 112, cause the computing system 100 to perform one or more of the functions described herein. Any software program instructions discussed in this description or shown in the drawings can be referred to as computer-readable program instructions, machine-readable instructions, or more simply, program instructions, or a software application.

Figure 11A:
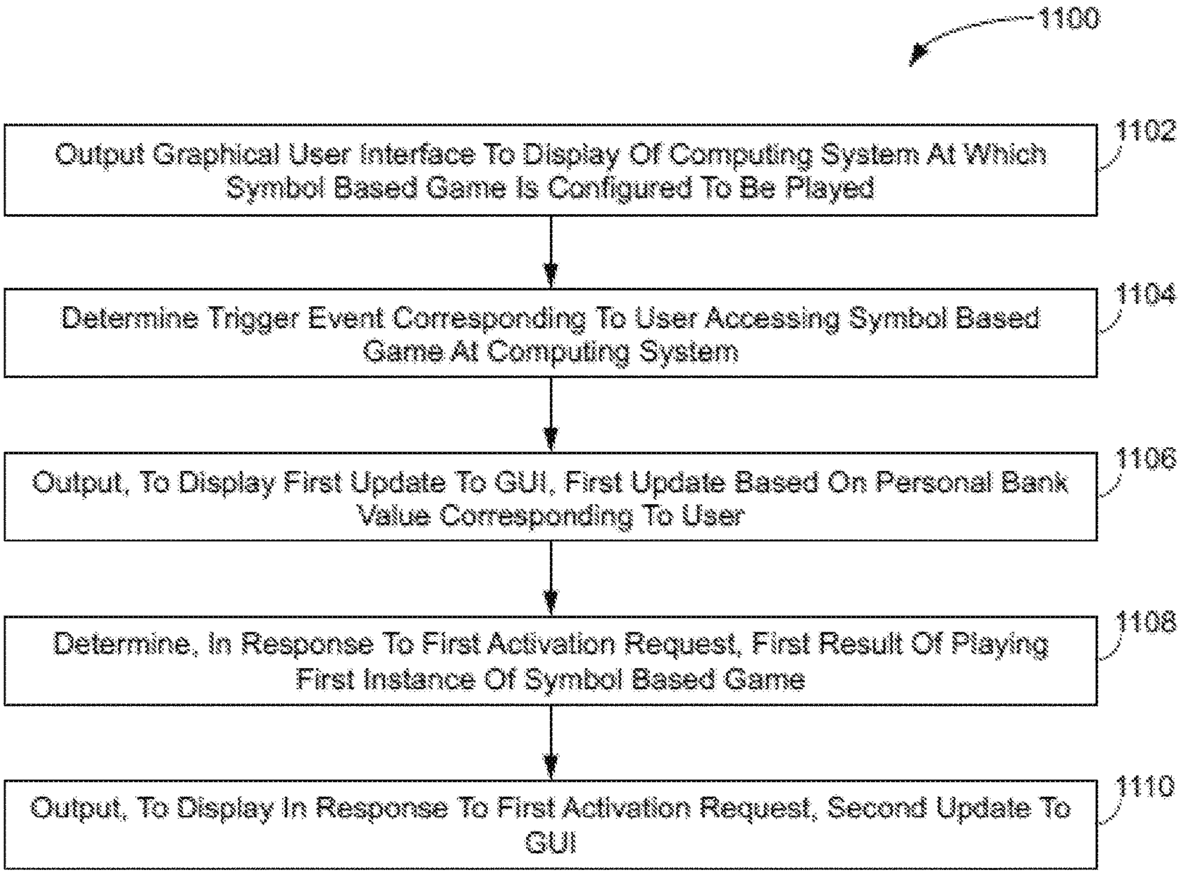
FIG. 11A is a flow chart showing functions of a method for providing symbol-based events having personal bank features for progressive awards, in accordance with the example embodiments.
Figure 11B:
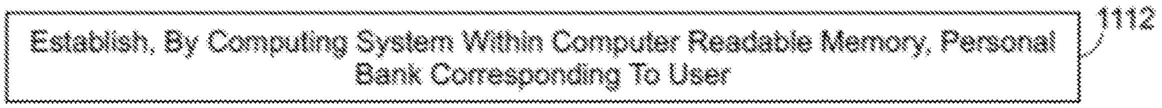
FIG. 11B, FIG. 11C, FIG. 11D, FIG. 11E, and FIG. 11F show additional functions corresponding the functions shown in FIG. 11A.
Figure 11C:
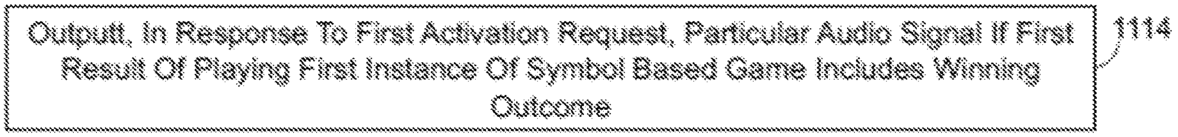
Figure 11D:
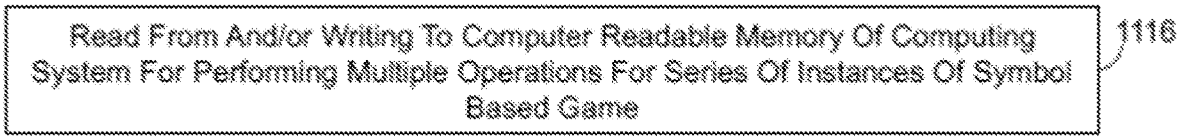
Figure 11E:
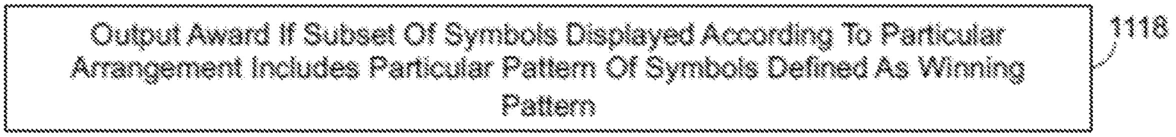
Figure 11F:
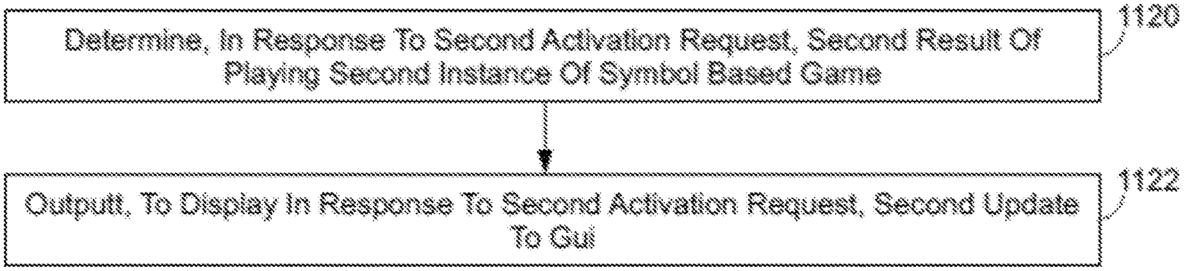

As an example, the program instructions can be executable by the processor 112 to perform a method, such as a method including one or more of the functions shown in FIG. 11A, FIG. 11B, FIG. 11C, FIG. 11D, FIG. 11E, and/or FIG. 11F.

As another example, the program instructions can be executable by the processor 112 to determine a payment has been received by the user interface 104 (e.g., by the acceptor 107) and thereafter allow an outcome to be output in response to an input entered via the user interface 104.

The memory 114 can also include operating system software on which the computing system 100 can operate. For example, the computing system 100 can operate on a Windows®-based operating system available from the Microsoft® Corporation of Redmond, Wash. Other examples of an operating system are possible.

The memory 114 can include a database. As an example, the memory 114 can include a credit account database containing data related to performing an outcome event by a computing system, as well as adjusting account balances (e.g., quantities of credits) associated with client computing systems. The processor 112 can write data into the database and read data within the database.

Figure 2:
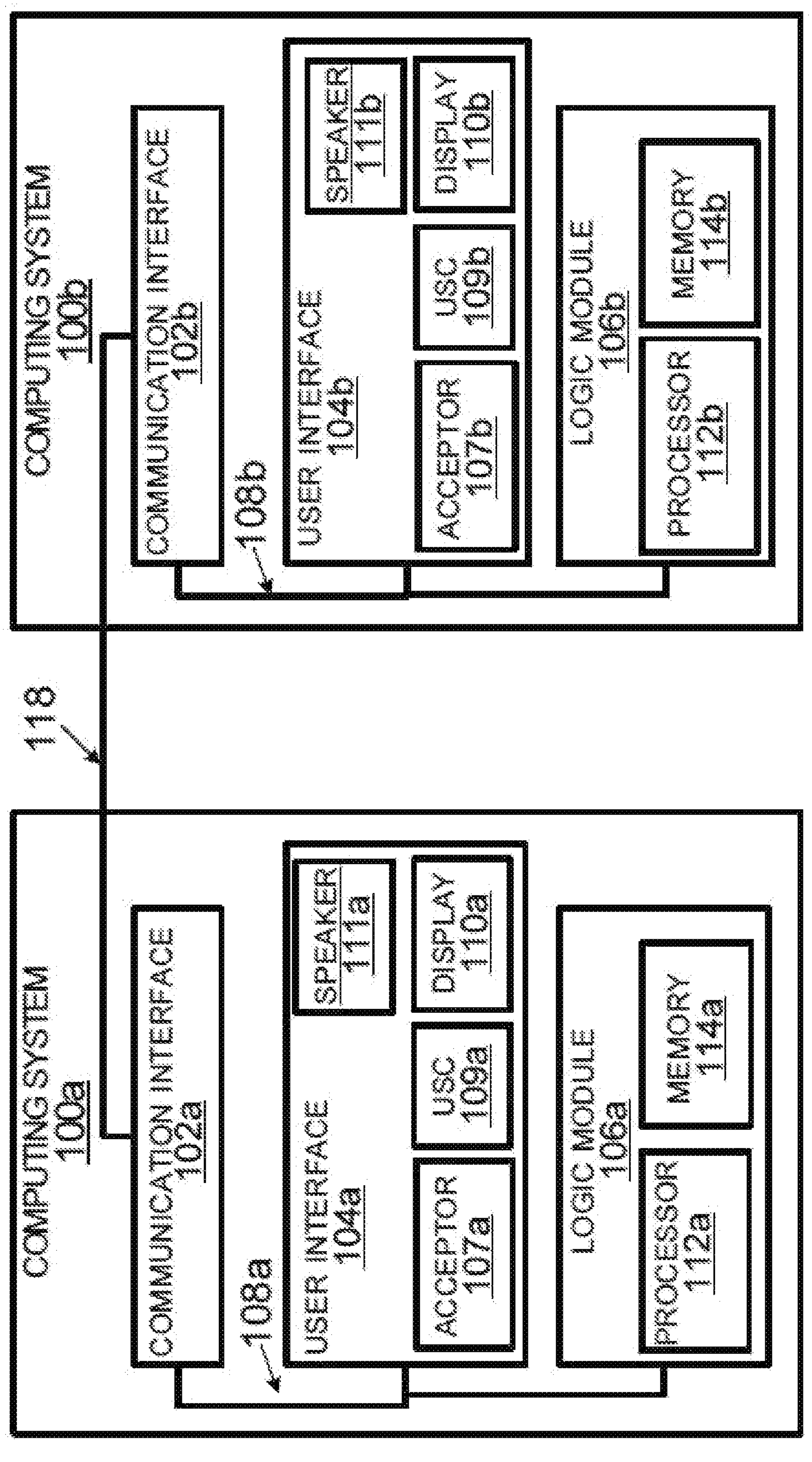
FIG. 2 is a block diagram of two computing systems connected to one another via a computer network, in accordance with the example embodiments.

FIG. 2 is a block diagram of a computing system 100*a* connected to a computing system 100*b* over a communication network 118. A configuration of elements including the computing system 100*a* and the computing system 100*b* can be referred to as a server-client based configuration.

The components of the computing system 100*a* and the computing system 100*b* are shown with corresponding "a" and "b" reference numerals (i.e., based on the computing system 100). For example, the computing system 100*a* includes a communication interface 102*a*, a user interface 104*a* (which includes an acceptor 107*a*, a user-selectable control 109*a*, a display 110*a*, and/or a speaker 111*a*), a logic module 106*a* (which includes a processor 112*a* and/or a memory 114*a*), and a communication bus 108*a*. Likewise, the computing system 100*b* includes a communication interface 102*b*, a user interface 104*b* (which includes an acceptor 107*b*, a user-selectable control 109*b*, a display 110*b*, and/or a speaker 111*b*), a logic module 106*b* (which includes a processor 112*b* and/or a memory 114*b*), and a communication bus 108*b*. In at least some embodiments, the acceptor 107*a* includes a validator, and the acceptor 107*b* includes a paper money acceptor, a coin acceptor, a validator, and/or a card reader.

The computing system 100*a* is configured to communicate with the computing system 100*b* over the communication network 118 (via the communication interface 102*a* and the communication interface 102*b*). Likewise, the computing system 100*b* is configured to communicate with the computing system 100*a* over the communication network 118. For purposes of this description, any data described as being sent or transmitted by the computing system 100*a* can include data sent by the communication interface 102*a* over the communication network 118. Similarly, any data described as being sent or transmitted by the computing system 100*b* can include data sent by the communication interface 102*b* over the communication network 118. Furthermore, for purposes of this description, any data described as being received by the computing system 100*a* can include data the computing system 100*a* receives from the communication network 118 using communication interface 102*a*. Similarly, any data described as being received by the computing system 100*b* can include data the computing system 100*b* receives from the communication network 118 using the communication interface 102*b*.

In at least some embodiments, the communication network 118 includes a local area network (LAN), such as a LAN located at least partially within a casino. In accordance with those embodiments, multiple instances of the computing system **100*b* dispersed throughout the casino can communicate with the computing system 100*a*. In some cases, the computing system 100*a* can be located within the casino. In some other cases, the computing system 100*a*** can be located away from the casino.

In another example, the communication network 118 can include a wide-area network (WAN), such as an Internet network or a network of the World Wide Web. In such a configuration, the computing system **100*b* can communicate with the computing system 100*a* via a website portal (for a virtual casino) hosted on the computing system 100*a*. The data described herein as being transmitted by the computing system 100*a* to the computing system 100*b* or by the computing system 100*b* to the computing system 100*a*** can be transmitted as datagrams according to the user datagram protocol (UDP), the transmission control protocol (TCP), or another protocol, and/or a file (e.g., a hypertext transfer protocol file) or some other type of file or communication.

The communication network 118 can include any of a variety of network topologies and network devices. The communication network 118 can include a wireless and/or wired network topology and network devices operable on one or both of those network topologies. As an example, the communication network 118 can include a public switched telephone network, a cable network, a cellular wireless network, a wide area network (WAN), a local area network, an IEEE® 802.11 standard for wireless local area networks (wireless LAN) (which is sometimes referred to as a WI-FI® standard) (e.g., 802.11a, 802.11b, 802.11g, 802.11n, or 802.11p), and/or a network operating according to a BLUETOOTH® standard (e.g., the BLUETOOTH® standard 5.3) developed by the Bluetooth Special Interest Group (SIG) of Kirkland, Washington.

As noted, the computing system 100 can include the acceptor 107. In at least some embodiments, the acceptor 107 includes an acceptor of a physical item associated with a monetary value, such as a paper money acceptor, a coin acceptor, or a card reader. The acceptor 107 can include a validator configured to identify the physical item, and determine whether the physical item is suitable as payment to the computing system 100. A coin acceptor can be configured to accept and identify a coin distributed by a geo-political body or a token generated for an organization other than a geo-political body, such as a casino. A card reader can be configured to read a bank card (e.g., a credit or debit card) or a customer card (e.g., a casino loyalty card).

In at least some embodiments, the computing system 100 can also physically dispense a corresponding award or payout (e.g., cash), or otherwise facilitate the payout (by adding funds to an electronic account associated with a customer card). Such an activity can be triggered by a cash out button either on the display 110 or elsewhere on the computing system 100. Additionally or alternatively to determining the payout amount, the computing system 100 can perform other actions to award the user. For instance, the computing system 100 can display an indication of a tangible prize. Other types of awards can be used as well.

For purposes of this description, a function that can be performed by the computing system 100, the computing system **100*a*, or the computing system 100*b* can be performed, at least in part, by a processor of that computing system executing program instructions and/or a software application. Those program instructions and/or software application can be stored within the memory 114, 114*a*, or 114*b***, respectively.

The memory 114, **114*a*, and 114*b* can also store data. The memory 114, 114*a*, 114*b*** can include a global symbol group for an outcome event that includes multiple symbols, such as a reel-based outcome event. As an example, the multiple symbols can include a wild symbol, an ace symbol, a king symbol, a queen symbol, a jack symbol, a ten symbol and/or a nine symbol. The ace, king, queen, jack, ten and nine symbols can represent symbols found on a standard deck of playing cards. The wild symbol can have special properties that allow it to form winning combinations with other symbols. In at least some embodiments, an "A" symbol represents the ace symbol, a "K" symbol represents the king symbol, a "Q" symbol represents the queen symbol, a "J" symbol represents the jack symbol, a "10" symbol represents the ten symbol, and a "9" symbol represents the nine symbol. Other examples of symbols within the global symbol group are possible.

In at least some embodiments, the symbol group generally has a "hierarchy", which can define different values for at least some of the symbols. For example, a winning pattern including three lower-value symbols (e.g., a "9" symbol) will have a lower value than a winning pattern with three higher-value symbols (e.g., a "10" symbol).

However, such a global symbol group can be customized with particular symbols as desired. As some possible examples, the symbols can include images of people, animals, dinosaurs, fanciful creatures, cartoon characters, inanimate objects, or other things in addition to or instead of wild, ace, king, queen, jack, ten or nine symbols. Furthermore, wild symbols can vary in design. The global symbol group can be represented as a table (or other data structure) stored in the memory 114.

A memory can include one or more memories. For example, a memory can include the memory 114. As another example, a memory can include the memory **114*a* and the memory 114*b*. In accordance with this latter example, a memory can be arranged as a distributed memory. One or more processors can be operatively coupled to a memory. For example, the processor 112 is operatively coupled to the memory 114. As another example, the processor 112*a* is operatively coupled to the memory 114*a*, and the processor 112*b* is operatively coupled to the memory 114*b***. In accordance with this latter example, a processor can be arranged as a distributed processor.

Figure 3A:
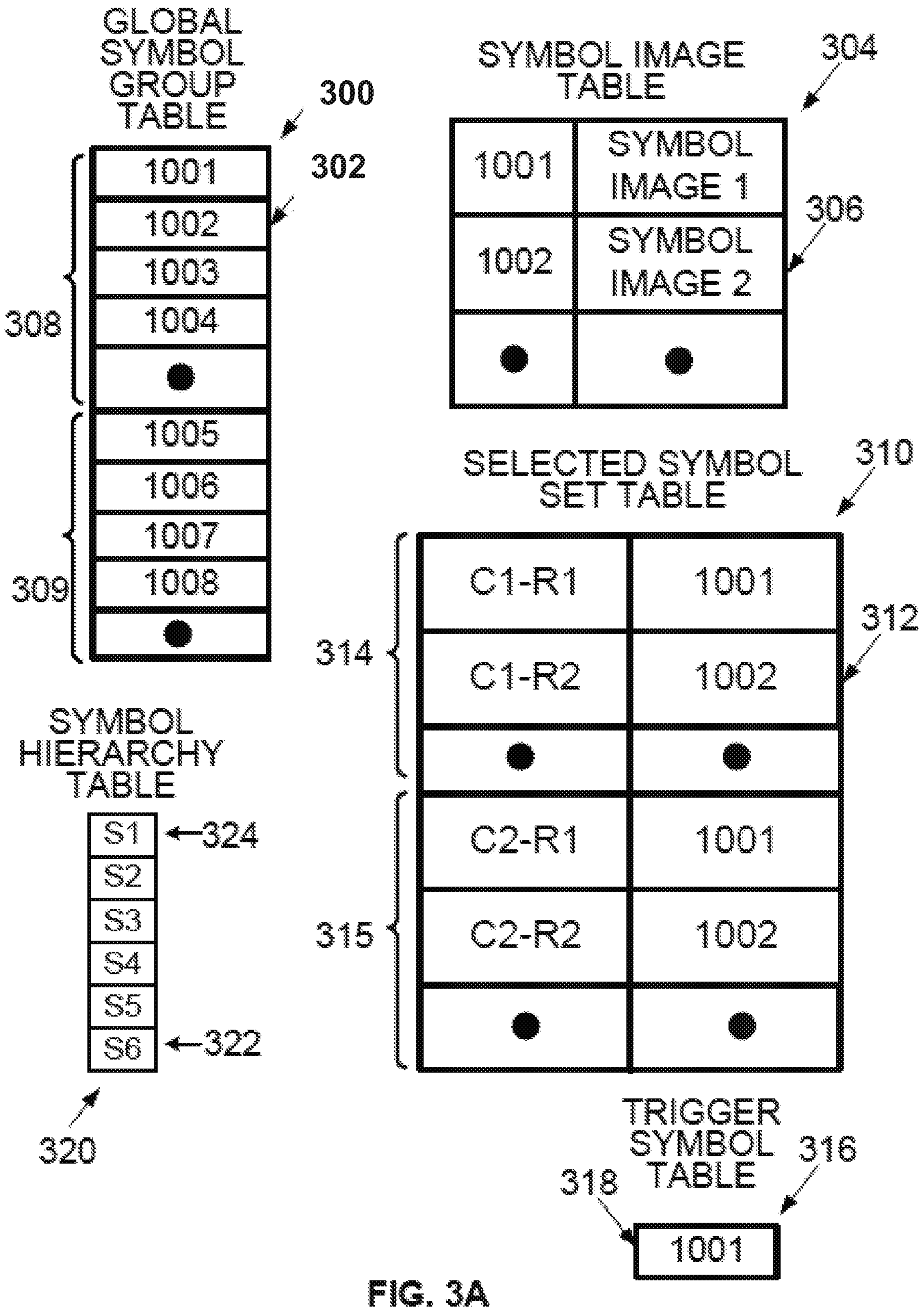
FIG. 3A and FIG. 3B show data, including personal bank values corresponding to various user identifiers, that can be stored in a memory in accordance with the example embodiments.

Next, FIG. 3A data that can be stored in a memory (e.g., the memory 114, **114*a*, 114*b*) in accordance with the example embodiments. In particular, FIG. 3A shows a global symbol group table 300 in accordance with the example embodiments. The global symbol group table 300 includes multiple records 302, each including an identifier (e.g., 1001, 1002, 1003 1004, etc.) that represents a particular symbol. In one example, the global symbol group, and therefore the global symbol group table 300, can be divided into multiple sub-groups (e.g., a sub-group 308, 309**).

Figure 5:
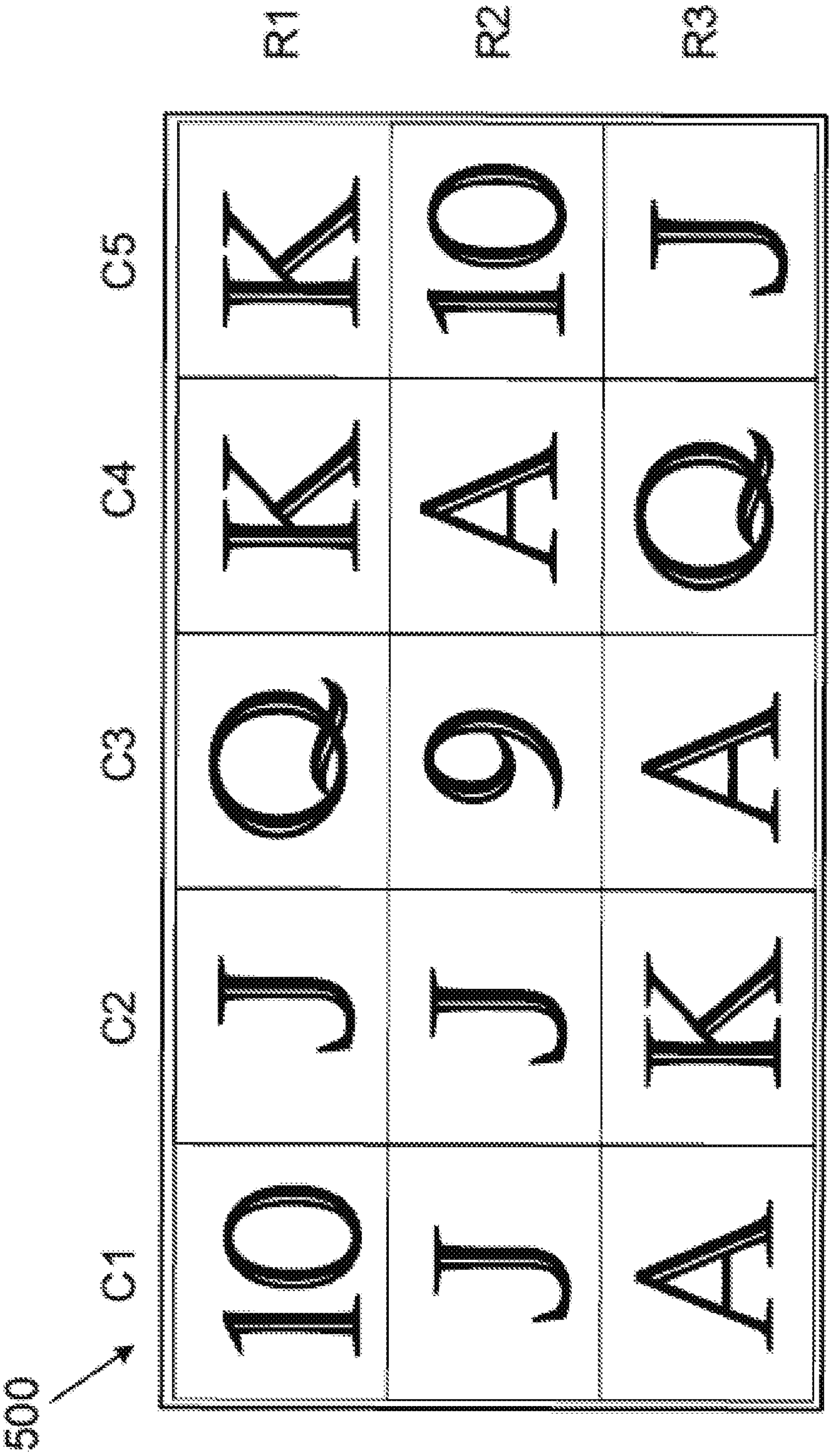
FIG. 5 depicts a selected symbol set in a display, in accordance with the example embodiments.

The global symbol group table 300 can be used in connection with a symbol image table 304. The symbol image table 304 includes multiple records 306 (shown as distinct rows of the symbol image table 304), each including an identifier that represents a particular symbol, and a corresponding displayable image. As such, the symbol image table 304 can be used to map an identifier in the global symbol group table 300 to a displayable image. Such an image can be arranged according to the Joint Photographic Experts Group (JPEG), Graphics Interchange Format (GIF), or Portable Network Graphics (PNG) encodings, for example. As an example, the image can include a representation of a symbol from a playing card in a typical deck of playing cards, such as a “9” symbol, a “10” symbol, a “J” symbol, a “Q” symbol, a “K” symbol, and an “A” symbol, examples of which are shown in FIG. 5. As another example, the image can include a representation of other symbols from a playing card or typical computer-based event, such as a “lightning bolt” symbol, a “sun” symbol, a “club” symbol, a “heart” symbol, a “moon” symbol, and a “diamond” symbol, examples of which are shown in FIG. 6A, FIG. 6B, FIG. 6C, FIG. 6D, and FIG. 6E. Other examples of symbols are also possible.

During the course of an event, various symbol sets can be selected for display. Each selected symbol set can be stored in a table such as a selected symbol set table 310. The selected symbol set table 310 includes multiple records 312 (shown as distinct rows in selected symbol set table 310), each record including a symbol position of the symbol, and an identifier that represents the symbol. As such, each symbol in the selected symbol set can correspond to a respective symbol position in a display arrangement (e.g., both a column number and a row number in a column-and-row arrangement). As an example, C1-R1, shown in the selected symbol set table 310, represents a symbol position at column 1 (e.g., a left-most column of multiple columns in a symbol-display-portion of display 110) and row 1 (e.g., a top row of multiple rows in a symbol-display-portion of the display 110). The column identifiers in the selected symbol set table 310 (e.g., C1 and C2) can refer to columns in a symbol matrix or reels of multiple reels that can be spun.

Portions of the multiple records 312 can be grouped into a respective subset of symbol records. As an example, a subset of symbol records can include all the symbol records for a particular column or reel in a matrix. For instance, a subset 314 of symbol records can include all the symbol records for column C1 and/or a corresponding reel, and a subset 315 of symbol records can include all of the symbol records for column C2 and/or a corresponding reel. A person having ordinary skill in the art will understand that the global symbol group table 300 can include more than two subsets of symbol records, and the subsets of symbol records can correspond to an aspect other than a particular column (e.g., a particular row).

In accordance with the example embodiments, the computing system 100 can select a symbol set for outputting on the user interface 104 by iterating through each record 312 in the selected symbol set table 310. As an example, for each symbol position in the selected symbol set table 310 (i.e., each symbol position in the left-most column of the selected symbol set table 310), the processor 112 can determine a symbol identifier from among the symbol identifiers in the global symbol group table 300. In at least some embodiments, the symbol identifiers are numbers and the processor 112 uses a random number generator to determine numbers in the global symbol group table 300 to associate with each symbol position in the selected symbol set table 310. Other examples of how the computing system 100 and/or the processor 112 randomly determine symbols for the selected symbol set table 310 are also possible.

In at least some embodiments, the computing system 100 determines each symbol of the selected symbol set table 310 by randomly selecting any symbol from within the selected symbol set table 310.

In at least some other embodiments, the computing system 100 determines each symbol of the selected symbol set table 310 by randomly selecting each symbol for each subset of symbol records (e.g., the subset 314, 315 of symbol records) from a corresponding sub-group within the global symbol group table 300. For example, the computing system 100 can determine the symbols for the subset 314 of symbol records by randomly selecting symbols from the sub-group 308 and determine the symbols for the subset 315 of symbol records by randomly selecting symbols from the sub-group 309.

In at least some embodiments, the computing system 100 can first determine the symbols within the selected symbol set table 310 from the global symbol group table 300 and then determine a symbol position for each of those symbols. Determining the symbol position for a symbol can include the computing system 100 randomly selecting a symbol position from among multiple remaining, unassigned symbol positions and assigning the selected symbol position to one of the predetermined symbols. As an example, selecting the symbol position for an embodiment in which the display arrangement is a column-and-row arrangement can include the computing system 100 randomly determining a column identifier and a row identifier (from a set of remaining, unassigned column and row identifier combinations) for each of the predetermined symbols until there is only one remaining, unassigned column and row identifier. A last predetermined symbol would then be assigned to correspond to the one remaining, unassigned column and row identifier. As another example, selecting the symbol position for an embodiment in which the display arrangement is specified using symbol position identifiers (e.g., whole number 1 through 15, inclusive) can include the computing system 100 randomly determining a symbol position identifier (from a set of remaining, unassigned symbol position identifiers) for each of the predetermined symbols until there is only one remaining, unassigned symbol position identifier. A last predetermined symbol would then be assigned to correspond to the one remaining, unassigned symbol position identifier.

In accordance with embodiment in which a column and row arrangement is used to simulate reels, the computing system 100 can display each subset of selected symbols in a corresponding column. As an example, the computing system 100 can superimpose each subset of selected symbols over a virtual reel in a corresponding column. Thus, a sub-group 308, 309 can represent an ordering of symbols on a particular reel.

As another example, the memory can contain a symbol hierarchy table 320. The symbol hierarchy table 320 can include an ordered list of symbols. The ordered list of symbols can include at least a portion of the symbols within global symbol group table 300. As shown in FIG. 3A, the symbol hierarchy table 320 includes a symbol S1, S2, S3, S4, S5, S6 arranged in an order from a first symbol 322 (i.e., symbol S6) to a final symbol 324 (i.e., symbol S1). A person having ordinary skill in the art will understand that the symbol hierarchy table 320 includes a different quantity of symbols. In accordance with at least some implementations, symbol S6 can be a “9” symbol, symbol S5 can be a “10” symbol, symbol S4 can be a “J” symbol, symbol S3 can be a “Q” symbol, symbol S2 can be a “K” symbol, and symbol S1 can be an “A” symbol.

FIG. 3A also shows a trigger symbol table 316. The trigger symbol 316 can include an identifier 318 of one or more symbols a processor uses to determine whether an event has been triggered. As an example, the identifier 318 can include the identifier 1001 discussed above as representing a particular symbol (e.g., a scatter symbol). As an example, the identifier 318 can include an identifier of a diamond symbol or some other symbol a processor uses to determine whether an event that uses a personal bank has been triggered by landing of the symbol represented by the identifier 318. A trigger event determination module 1010 shown in FIG. 10 can refer to the trigger symbol table 316 and/or the identifier 318 during its execution by a processor.

Figure 3B:
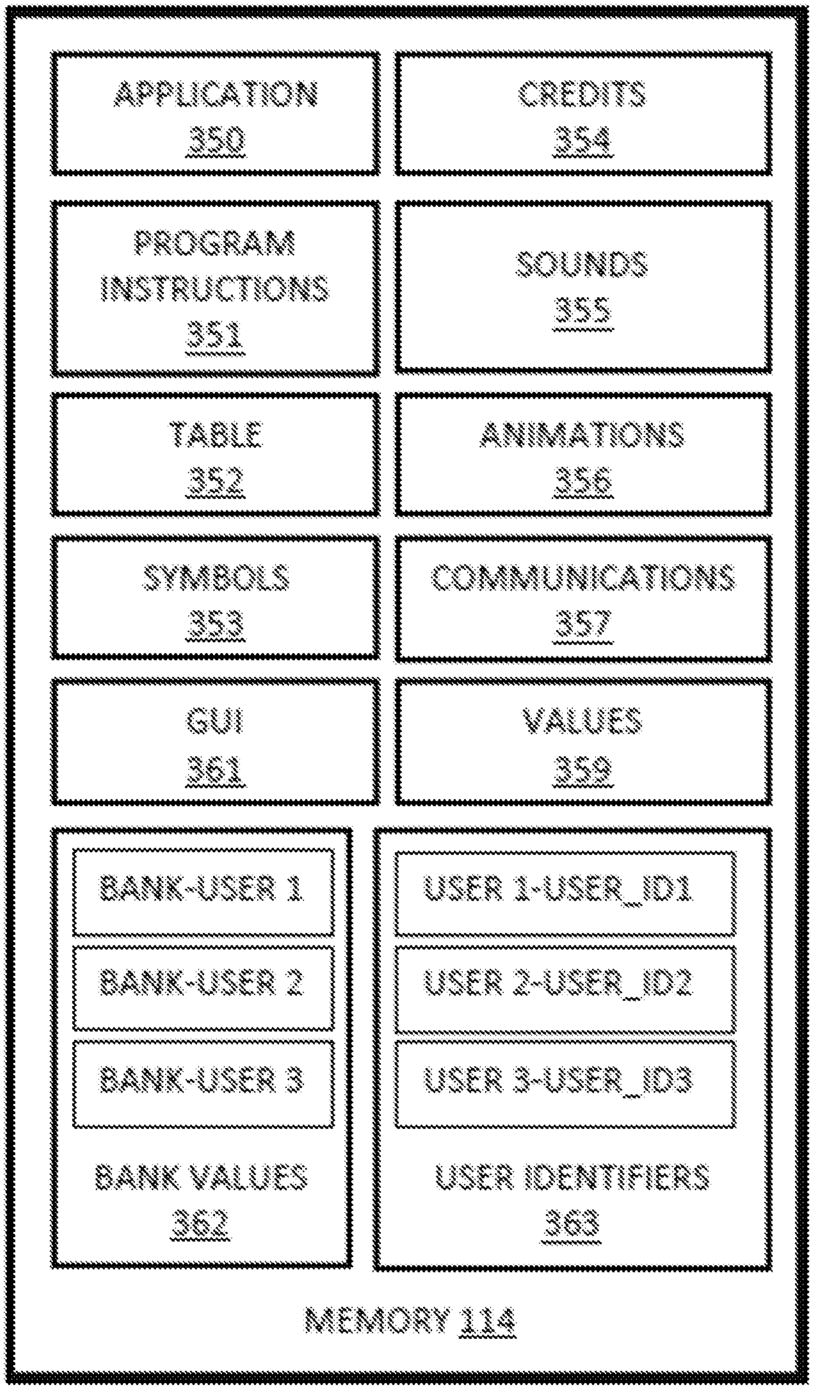

Next, FIG. 3B shows the memory 114 and data that can be stored in the memory in accordance with the example embodiments. The memory 114*a* can contain at least some of the data stored in the memory 114. Likewise, the memory 114*b* can contain at least some of the data stored in the memory 114. In at least some embodiments, at least a portion of the memory 114 is embodied as a data register within the processor 112.

As shown in FIG. 3B, the memory 114 can include one or more from among: an application 350, program instructions 351, a table 352, symbols 353, credits 354, sounds 355, animations 356, communications 357, values 359, a GUI 361, bank values 362, and user identifiers 363.

The application 350 can include any software application discussed in this description. The application 350 can also include an operating system, such as any operating system described in this description.

Figure 10:
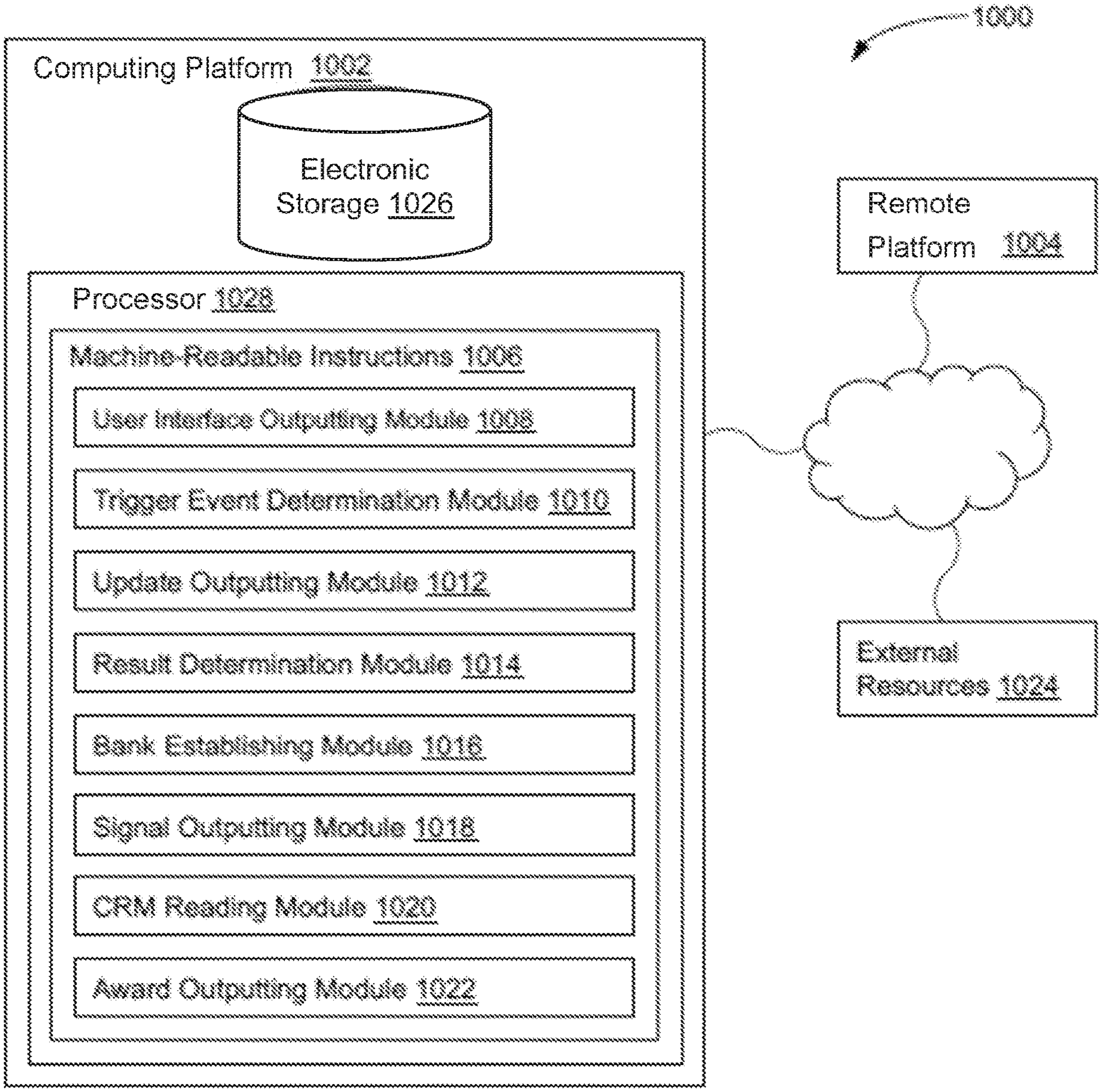
FIG. 10 is a block diagram of a computing system configured for providing symbol-based events having personal bank features for progressive awards, in accordance with the example embodiments.

The program instructions 351 are computer-readable program instructions (e.g., machine-readable instructions) executable by one or more processors. The program instructions 351 can be executable to cause a computing system or a component of the computing system to perform any function described in this description. The program instructions can include the application 350. The program instructions 351 can include one or modules. As an example, the modules of the program instructions 351 can include one or more from among: a user interface outputting module 1008, a trigger event determination module 1010, an update outputting module 1012, a result determination module 1014, a bank establishing module 1016, a signal outputting module 1018, a computer-readable memory reading module 1020, an award outputting module 1022, and/or other instruction modules. Each of those modules is shown in FIG. 10.

The table 352 can include one or more tables, such as one or more tables shown in FIG. 3A or a table in this description such as Table A, Table B, Table C, or Table D. In at least some embodiments, the memory 114 can contain any data described as being stored in a table in some manner other than a table. As an example, the memory 114 can store program instructions that include data described as being contained in a table.

The symbols 353 can include computer-readable data a processor can read to generate a symbol on a display screen, graphical display unit, graphical display interface, or GUI. As an example, the symbols 353 can include a respective computer-readable file (e.g., a bitmap file) for each symbol. As another example, the symbols 353 can include a computer-readable file a processor can read to generate any symbol discussed in this description and/or shown in the drawings, such as a "9" symbol, a "10" symbol, a "J" symbol, a "Q" symbol, a "K" symbol, or an "A" symbol. A table, such as the symbol image table 304, can include an index value (e.g., a numerical identifier or a file name) corresponding to a symbol in the symbols 353.

The credits 354 can include a number of credits available for a user of a computing system. The number of credits can be referred to as a credit value. If the credits 354 are stored in the memory 114*b*, the credits can include a number of credits available for a user of the computing system 100*b*. If the credits 354 are stored in the memory 114*a*, the credits can include a respective number of credits available for a user of a respective computing system arranged like the computing system 100*b*. A processor can update the credits available for each user based on payments entered at a computing systems by that user, awards earned by use of the computing system by that user, and/or by use of an acceptor and/or validator. The credit value and/or the token value can be output on the display 110, 110*a*, 110*b*.

The sounds 355 include audio files (e.g., an audio clip) that the processor 112 can output to a speaker. Outputting an audio file can include outputting a signal that produces a particular sound when the signal passes through a speaker. As an example, the particular sound can include a first particular sound to play when reels are spinning on the display 110*b* or a second particular sound to play when symbols are being upgraded between outcome events. As another example, the particular sound can include a particular sound played for winning a progressive jackpot. As another example, the sounds 355 can include an audio file, such as an audio file with one of the following file name extensions: WAV, MP3, MP4, WMA, or some other file name extension.

Each sound in the sounds 355 can correspond to an index value such that the processor 112*a* can provide the processor 112*b* with an instruction including a particular index value so that the processor 112*b* outputs via the speaker 111*b* an audio file corresponding to the particular index value. Accordingly, the processor 112*a* does not have to transmit the audio file to the processor 112*b* each time the audio file is to be output via the speaker 111*b*.

The animations 356 can include computer-readable files containing animations on a display, such as the display 110, 110*a*, 110*b*. As an example, the animations 356 can include animation files, such as an animation file with one of the following file name extensions: GIF, PNG, JPEG, SVG, or some other file name extension. Each animation in the animation 356 can correspond to an index value such that the processor 112*a* can provide the processor 112*b* with an instruction including a particular index value so that the processor 112*b* outputs via the display 110*b* an animation file corresponding to the particular index value. Accordingly, the processor 112*a* does not have to transmit the animation file to the processor 112*b* each time the animation file is to be output via the display 110*b*.

In at least some embodiment, an animation of the animations 356 is an entire graphical display output on the display 110, 110*a*, 110*b*. In at least some other embodiments, an animation of the animations 356 is a portion of a graphical display output on the display 110, 110*a*, 110*b*. Moreover, in at least some of those latter embodiments, multiple animations of the animations 356 are respective portions of a graphical display output on the display 110, 110*a*, 110*b*.

The communications 357 include one or more communications, such as one or more from among: a communication sent by the processor 112 coupled to the memory 114, a communication generated for transmitting by the processor 112 coupled to the memory 114, or a communication received by the computing system 100. As an example, for embodiment in which the communications 357 are stored in the memory 114*a*, the communications 357 can include a communication sent by the processor 112*a* to the computing system 100*b*, a communication generated for transmitting by the processor 112*a* coupled to the computing system 100*b*, or a communication received by the computing system 100*a*. As another example, for embodiment in which the communications 357 are stored in the memory 114*b*, the communications 357 can include a communication sent by the processor 112*b* to the computing system 100*a*, a communication generated for transmitting by the processor 112*b* coupled to the computing system 100*b*, or a communication received by the computing system 100*b*.

The values 359 can include values that indicate a current value in a personal bank corresponding to a user of the computing system, the value of an increase in the personal bank, and/or the value of a jackpot (e.g., a progressive jackpot) won as a result of performing an event. As an example, for an implementation in which a GUI 400 (shown in FIG. 7, FIG. 8 and FIG. 9) is output on the display 110, 110*a*, 110*b*, the GUI 400 can include a bank value 434 that indicates a current value in a personal bank corresponding to a user. The GUI 400 can also display a value of an increase in the personal bank, and/or a value of a progressive jackpot won. These values can be represented as monetary amounts.

The GUI 361 can include one or more graphical user interfaces. A GUI with the GUI 361 can include a static GUI that includes content that does not change. Additionally or alternatively, a GUI within the GUI 361 can include a dynamic GUI with one or more aspects that are configured to change while the GUI is output on the display 110, 110*a*, 110*b*. As an example, a changeable aspect of a GUI can include an aspect in which an animation of the animations 356 is displayed. In particular, for example, the aspect can include a symbol-display-portion in which an animation of a selected reel set is spun and stopped during a feature event described herein. As another example, a GUI within the GUI 361 can include one or more monetary amounts, such as one or more monetary amounts for payouts, payments, credits, and/or personal banks discussed with respect to a GUI 400 shown in FIG. 4.

The bank values 362 can include a value that indicates the current amount in a user's personal bank used to determine user-specific progressive jackpots uniquely associated with such user's event performance account so that the bank value is stored for the user during inactive periods and available when the user resumes event performance via the computing system 100, 100*a*, 100*b* (e.g., a first computing system previously used by the user for event performance or a second computing system other than the first computing system). As an example, for an implementation in which the GUI 400 (shown in FIG. 4, FIG. 7, FIG. 8, and/or FIG. 9) is output on the display 110, 110*a*, 110*b*, the value of the personal bank can be displayed as a monetary amount within a portion of the GUI 400. These bank values 362 may typically be in memory 114 for a server that serves multiple clients, rather than a stand-alone machine.

The user identifiers 363 can include a USER ID associated with a login credential such as a mobile phone number corresponding to the user, an email address corresponding to the user, a biometric identifier corresponding to the user, a globally unique identifier corresponding to the user, a password assigned to the user, and/or a confirmation from a multi factor authentication application. As an example, for an implementation in which the computing system 100, 100*a*, 100*b* received the entry of a login credential corresponding to a user ID, such as USER_ID2, the user ID can be used to determine that User 2 is using the computing system for performance of an event. The bank value 362 for User 2 is the applicable bank value for such user. These user identifiers 363 may typically be in memory 114 for a server that serves multiple clients, rather than a stand-alone machine.

Figure 4:
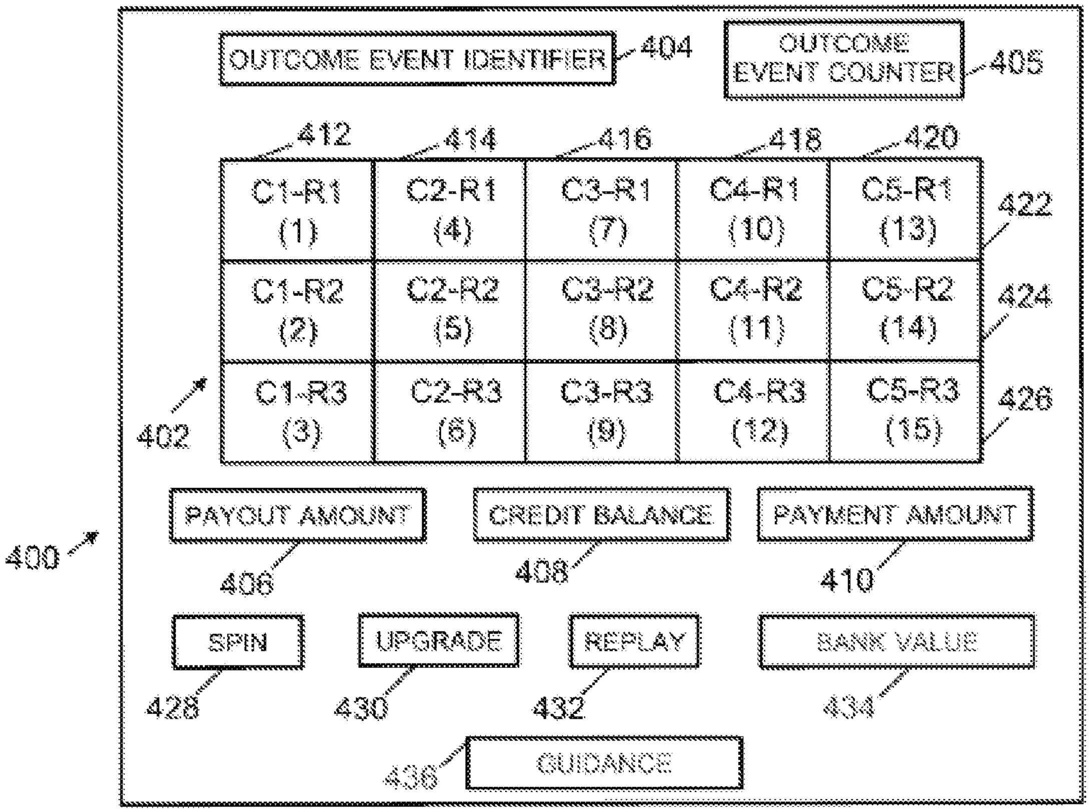
FIG. 4 shows a graphical user interface (GUI) including a personal bank value and user guidance, in accordance with the example embodiments.

Next, FIG. 4 depicts a GUI 400 that the computing system 100, the computing system 100*a*, or the computing system 100*b* can output on the display 110, 110*a*, and 110*b*, respectively. For purposes of this description, each element of the GUI 400 can be a displayable element of the GUI 400. The GUI 400 includes a symbol-display-portion 402, an outcome event identifier 404, an outcome event counter 405, a payout amount indicator 406, a credit balance indicator 408, and a payment amount indicator 410.

The symbol-display-portion 402 can include multiple symbol-display-segments and multiple symbol positions. As an example, the symbol-display-segments can include a vertical symbol-display-segment (SDS) 412, 414, 416, 418, 420. As another example, the symbol-display-segments can include a horizontal symbol-display-segment 422, 424, 426. Each symbol-display-segment can include multiple symbol positions. The vertical SDS 412 to the vertical SDS 420 are shown as having three symbol positions. The horizontal SDS 422, 424, 426 are shown as having five symbol positions. A person skilled in the art will understand that those symbol-display-segments can be configured with a different number of symbol positions.

In at least some embodiments, the vertical SDS 412, 414, 416, 418, 420 is configured as a spinnable reel. The GUI 400 can display the spinnable reels spinning by displaying an animation of the reels spinning and the displaying reels coming to a stop. For vertical SDS 412, 414, 416, 418, 420, the spinnable reels can spin in a vertical direction (e.g., top to bottom or bottom to top, with respect to the symbol-display-portion 402).

In at least some other embodiments, the horizontal SDS 422, 424, 426 is configured as a spinnable reel. The GUI 400 can display the spinnable reels spinning and stopped after spinning. For the horizontal SDS 422, 424, 426, the spinnable reels can spin in a horizontal direction (e.g., left to right or right to left, with respect to the symbol-display-portion 402).

The computing system 100 can cause a symbol-display-segment to spin, and to cause a spinning symbol-display-segment to stop spinning. The spinning and stopping of the spinning symbol-display-segment can be carried out for each outcome event. In accordance with the embodiments in which the symbol-display-portion 402 includes columns or reels that spin from top to bottom or bottom to top, spinning the reels can include starting the spinning from a left-most column or reel to a right-most column or reel. Stopping the reels can occur using a similar sequence. Other sequences of spinning and stopping the spinning can be used. Moreover, the spinning or stopping of spinning of two or more columns or reels can occur simultaneously.

The multiple symbol positions in the symbol-display-portion 402 are identified by column and row designators, in which C1=column 1, C2=column 2, C3=column 3, C4=column 4, C5=column 5, R1=row 1, R2=row 2, and R3=row 3. The multiple symbol positions in the symbol-display-portion 402 are also identified by distinct numerical identifiers shown within parenthesis. C1 can be a first SDS. C2 can be a second SDS. C3 can be a third SDS. C4 can be a fourth SDS. C5 can be a fifth SDS. As shown in FIG. 4, C2 is between C1 and C3, C3 is between C2 and C4, and C4 is between C3 and C5.

For a matrix arrangement with 15 symbol positions as shown in FIG. 4, the numerical identifiers can be whole numbers 1 through 15, inclusive. The processors or computing systems described herein can be configured to select a symbol position of the symbol-display-portion 402 using a random number generator that is configured to generate a number within the range 1 through N, inclusive, where N equals the number of symbol positions in the symbol-display-portion 402. For the matrix arrangement, each symbol-display-segment can be a distinct column of the multiple columns within the matrix. Alternatively, for the matrix arrangement, each symbol-display-segment can be a distinct row of the multiple rows within the matrix.

The processor of a computing system described herein can determine an operating state of the computing system and/or an outcome event that can occur during the determined operating state. In response to making those determination(s), the processor can cause the outcome event identifier 404 to display an identifier of the outcome event that can occur during the determined state. For example, the outcome event identifier can identify a base outcome event, a bonus outcome event or another type of outcome event. The bonus outcome event can be a "free spins" outcome event or some other outcome event.

The processor of a computing system described herein can determine a payment amount placed on an outcome event, an award or payout amount after or during occurrence of an outcome event resulting in a win, a credit balance after or while decreasing a number of credits based on a payment or after or while increasing a number of credits based on a determined award or payout amount, and/or a number of awarded remaining outcome events that can occur. The processor can cause the determined payment amount to be displayed by the payment amount indicator 410, the determined payout amount to be displayed by the payout amount indicator 406, the determined credit balance to be displayed by the credit balance indicator 408, and the number of awarded remaining outcome events to be displayed by the outcome event counter 405.

In at least some embodiments, a memory (e.g., the memory 114, 114*a*, 114*b*) can include a payout table. Moreover, in at least some of those embodiments, a processor (e.g., the processor 112, 112*a*, 112*b*) can read at least a portion of the payout table within the memory, and in at least some embodiments, the processor can output at least a portion of the table on a user interface (e.g., the user interface 104, 104*a*, 104*b*). The payout table can indicate various sets or combinations of symbols that are defined as a winning outcome and an award or payout corresponding to each winning outcome. A symbol in those sets or combinations can include a regular symbol or a wild symbol. A regular symbol represents only a single symbol. In contrast, a wild symbol can represent one or more regular symbols depending on what regular symbol is needed for a particular payline or payway including the wild symbol to result in a winning outcome and how many paylines or payways are evaluated by the processor.

As an example, a winning outcome can include three instances of the same regular symbol (or a combination of the same regular symbol and one or more wild symbols in three symbol positions) along a given payline or payway. As another example, a winning outcome can include four instances of the same regular symbol (or a combination of the same regular symbol and one or more wild symbols in four symbol positions) along a given payline or payway As yet another example, a winning outcome can include five instances of the same regular symbol (or a combination of the same regular symbol and one or more wild symbols in five symbol positions) on a given payline or payway. As yet another example, an award corresponding to one or more of the aforementioned winning outcomes can include an award of one or more credits added to a credit meter balance contained in a memory for a user using the computing system 100*b*. Other examples of a winning combination and a corresponding award within the payout table are possible.

The GUI 400 can include one or more user-selectable controls (USCs). As shown in FIG. 4, the GUI 400 can include a USC 428, 430, 432. Selection of the USC 428, 430, 432 can cause the processor 112*b* and/or another component of the computing system 100*b* to perform one or more functions. As an example, selection of the USC 428 can cause the processor 112*b* to transmit a spin request and/or a communication including a spin request. As another example, selection of the USC 430 can cause the processor 112*b* to upgrade a symbol shown on the display and/or to transmit a communication including an upgrade request. As yet another example, selection of the USC 432 can cause the processor 112*b* to replay an outcome event via the user interface 104*b*.

In at least some embodiments, a USC on a GUI can be reconfigured depending on an operating state of the computing system 100, the computing system 100*a*, or the computing system 100*b*. As an example, a single USC on the GUI 400 can be configured as the USC 428 when the computing system 100*b* is operating in an operating state in which the computing system 100*b* is not performing an outcome event for the computing system 100*b*, and as the USC 430 when the computing system 100*b* is operating in an operating state in which the computing system 100*b* is performing an outcome event for the computing system 100*b*.

In at least some of those embodiments, the single USC can be unelectable while the computing system 100*b* is performing a outcome event for the computing system 100*b* until the processor determines the outcome event includes a winning combination on a payline or payway. In other words, in at least some embodiments, the processor can deactivate a USC in response to an activation request, such as an activation request by selecting the USC 428. Additionally, the processor can reactivate the USC in temporal proximity to when the processor outputs an update to a GUI, such as an update including a result performing an event that includes spinning the vertical SDS 412, 414, 416, 418, 420. As an example, the temporal proximity can be immediately prior to outputting the update, at the same time as outputting the second update, or immediately after outputting the second update. The immediacy for those examples can be, for example, between 0 and 500 microseconds, such as between 0 and 400 microseconds, 0 and 300 microseconds, 0 and 250 microseconds, 0 and 200 microseconds, 0 and 100 microseconds, or 0 and 50 microseconds.

Additionally, the deactivation and reactivation of a USC is not limited to a USC that is output on a display. For example, the USC can include a hardware USC operatively coupled to an input of the processor.

The GUI 400 can include user information such as the bank value 434 and guidance 436. The bank value 434 can display a value indicating the current amount in a user's personal bank used to determine user-specific progressive jackpots uniquely associated with such user's account so that the bank value is stored for the user during inactive periods and available when the user resumes performing events via the computing system 100, 100*a*, 100*b*. As an example, for an implementation in which the GUI 400 (FIG. 7, FIG. 8, and/or FIG. 9) is output on the display 110, 110*a*, 110*b*, the value of the personal bank can be displayed as a monetary amount within the bank value 434 portion of the GUI 400. In at least some embodiments, the computing system 100, 100*a*, 100*b* can output the bank value 434 on the GUI 400 at all times the GUI 400 is output on the display.

The guidance 436 can include information to guide a user during event performance. As an example, the computing system 100, 100*a*, 100*b* can output information to guide a user how to carry out additional events to trigger the computing system 100, 100*a*, 100*b* to determine and add a further contribution to the particular user's personal bank. The computing system 100, 100_a_, 100_b_ can output information to guide a user as to how performance of additional events can result in rewards being output from the particular user's personal bank, as well as which symbols in the symbol-display-portion result in personal bank contributions. As an example, the processor 112, 112_a_, 112_b_ can output guidance on the GUI 400 to instruct performance and to the internal state of computing system 100, 100_a_, 100_b_. As an example, the guidance can indicate the bank value 434 has increased (e.g., after scatter symbols land on the display 110, 110_a_, 110_b_). As another example, the guidance can indicate that the bank value 434 is frozen (e.g., during free spins). As yet another example, the guidance can indicate the bank value 434 has been saved for future event performance. Such guidance can be displayed when a user is logging out to advise the user that resuming event performance brings back the bank value. As yet another example, the guidance can indicate an expiration date of the bank value 434 (or the corresponding bank that indicates the bank value 434) (e.g., a date the bank value or bank expires if event performance is not resumed by a threshold amount of time). As still yet another example, the guidance can indicate that an award based on the bank value 434 has been output. As still yet another example, the guidance can indicate the bank value 434 has been reset. As still yet another example, the guidance can include highlighting of scatter symbols that result in outputting an award based on the bank value or an increase in the bank value. Other examples of the guidance are possible.

Next, FIG. 5 shows a selected symbol set 500 in accordance with the example embodiments. The selected symbol set 500 can include symbols selected from the global symbol group table 300 for display during an outcome event. The symbols shown in FIG. 5 are arranged according to the symbol-display-portion 402. In particular, the selected symbol set 500 includes: (i) a "10" symbol at a symbol position C1-R1 and a symbol position C5-R2, (ii) a "J" symbol at a symbol position C2-R1, a symbol position C1-R2, a symbol position C2-R2, and a symbol position C5-R3, (iii) a "Q" symbol at a symbol position C3-R1, a symbol position C3-R2, and a symbol position C4-R3, (iv) a "K" symbol at a symbol position C4-R1, a symbol position C5-R1, and a symbol position C2-R3, and (v) an "A" symbol at a symbol position C4-R2, a symbol position C1-R3, and a symbol position C3-R3. Other arrangements of symbols, in terms of the number of columns, number of rows, or the layout of symbols, are possible.

III. Example Operation

In computer-based, symbol-based events that can lead to awards (e.g., symbol-based events such as ways-type and/or lines-type slot events), there are generally two types of jackpot awards. There are static jackpots which are fixed jackpot prizes associated with a particular event, and which are funded from a percentage of each wager. And, there are wide-area progressive jackpots which grow over time. Again, a specific percentage of every wagered amount, across multiple instances of events, performed by numerous users, contributes to a progressive prize fund. Wide-area progressive jackpots are desirable to users due to the significant jackpot values associated therewith, and are eventually won by/awarded to a single user. However, while many users use a computing system to perform such symbol-based events, wins of the main jackpot are rare. Some symbol-based events can include multiple different jackpot awards as part of a multi-level progressive system. Each of the jackpots grows with event performance, and each jackpot can have a unique trigger that results in a win thereof for the user. During event performance, different percentages of a user's wager can be allocated to each of the jackpot prizes. Due to the low likelihood of winning any of the jackpot prizes, performance of a significant number of events can be required to win even a single jackpot prize.

User-specific progressive jackpot prizes (i.e., progressive jackpot prizes linked to an individual user) are not currently a feasible option to implement in view of the low likelihood of winning a jackpot prize. In multi-level progressive events, this problem is compounded. For example, a computing system can manage ten jackpots, each jackpot corresponding to a unique award trigger. Performance of a significant quantity of events can be required before the computing system outputs a single one of the jackpot prizes. This can lead to a user experiencing an "unattainable return." Even though the particular user is the only user that contributes to each prize pool, the user will be aware that they are unlikely to ever win such money back, resulting in a disappointing experience.

Implementations described herein address the aforementioned shortcomings and other shortcomings by providing computer-based, symbol-based events and maintaining a user "bank" which functions as the user's own personal prize pool. During performance of the events, a value in the bank progressively increases and/or decreases based on outcomes of the events. The prize pool is used to reward the user based upon the value in the bank. By linking various prizes to a multiple of a progressive value, and by awarding a user their banked amount, the user does not have the unattainable return problem. The user is provided with a more favorable progressive prize pool experience.

Example embodiments of the present disclosure describe a computer-based, symbol-based event wherein a computing system provides personal bank features for progressive rewards. The computer-implemented user-specific progressive prize pool, or "bank" is unique to a particular user, and may be uniquely associated with a user's event performance account or wallet, so that the bank value is stored for the user during inactive periods and available when the user resumes event performance via the computing system (e.g., a first computing system previously used by the user for event performance or a second computing system other than the first computing system).

An event may include multiple prizes (possibly jackpot prizes) that are linked and proportional to the value of the user's bank, so that the computing system outputs awards based on a current full bank value every time that one of the prizes is won. In view of this feature, the user will not contribute to multiple prize pools that hold contributions captive, even though the user is still offered multiple different prizes that they could win.

As a result, the computing system can be configured to output awards/prizes to the user at desirable intervals or levels (e.g., landing different quantities of scatter symbols) based on the bank administered by the computing system for the user. In this way, a user contributes to a prize pool from which awards are payable only to the user.

Figure 6A:
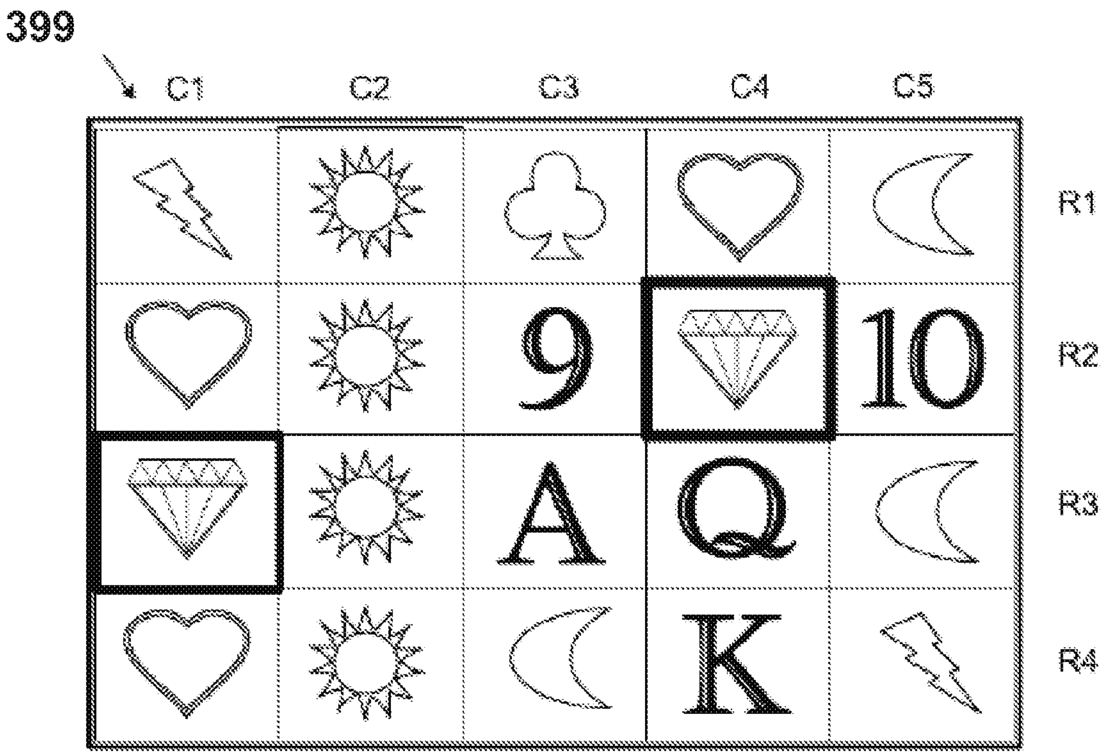
FIG. 6A, FIG. 6B, FIG. 6C, FIG. 6D, and FIG. 6E show a display portion of a GUI, including a symbol-display-portion showing a matrix of symbols including scatter symbols that lead to the personal bank value being changed, in accordance with the example embodiments.
Figure 6B:
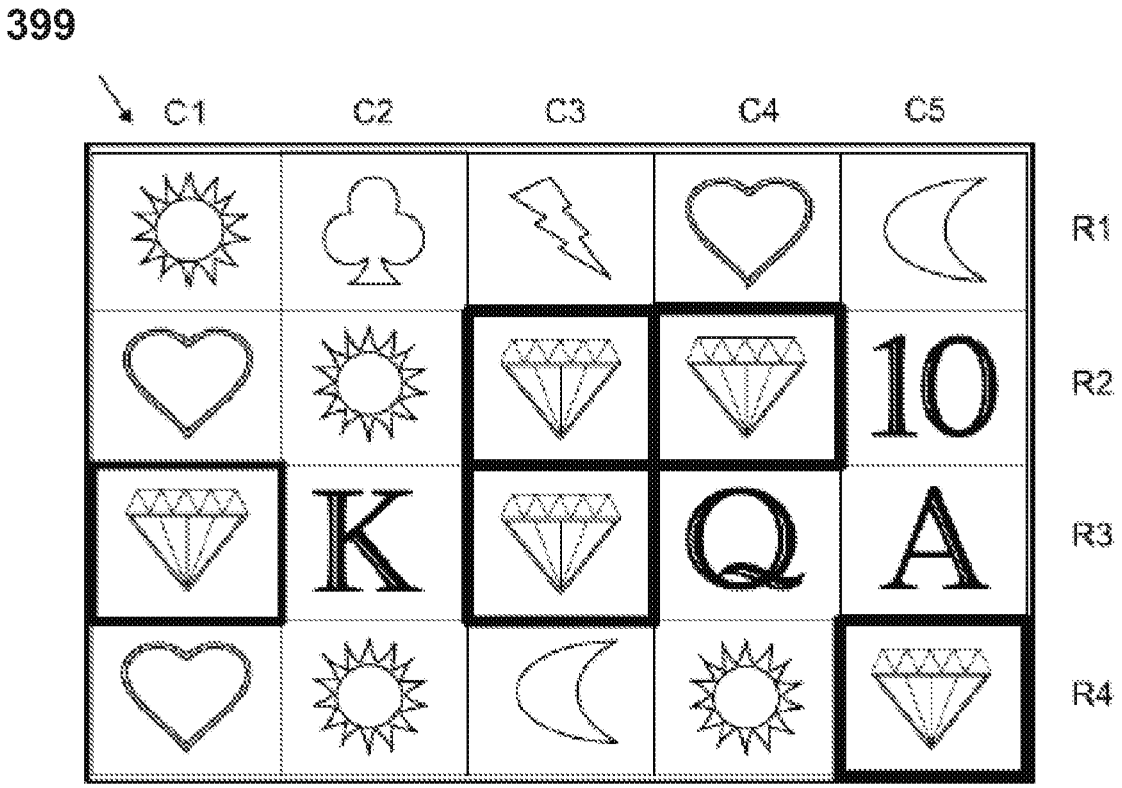
Figure 6C:
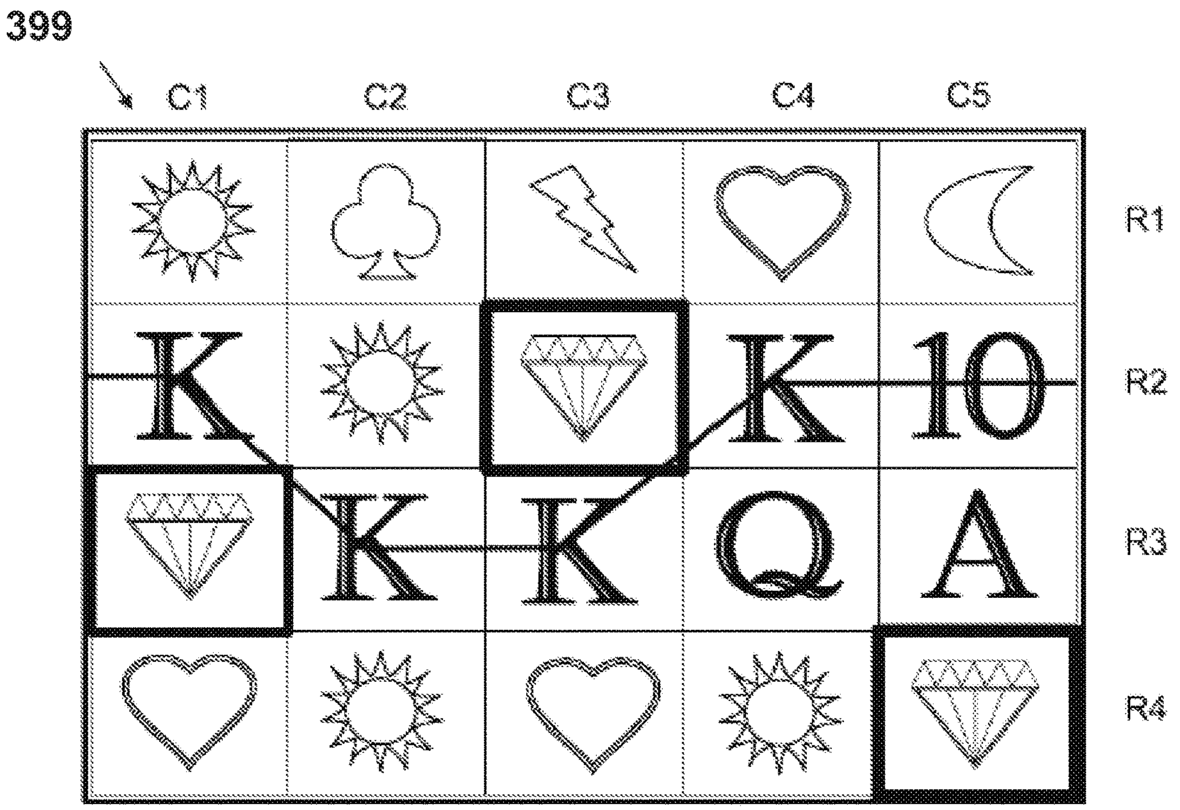
Figure 6D:
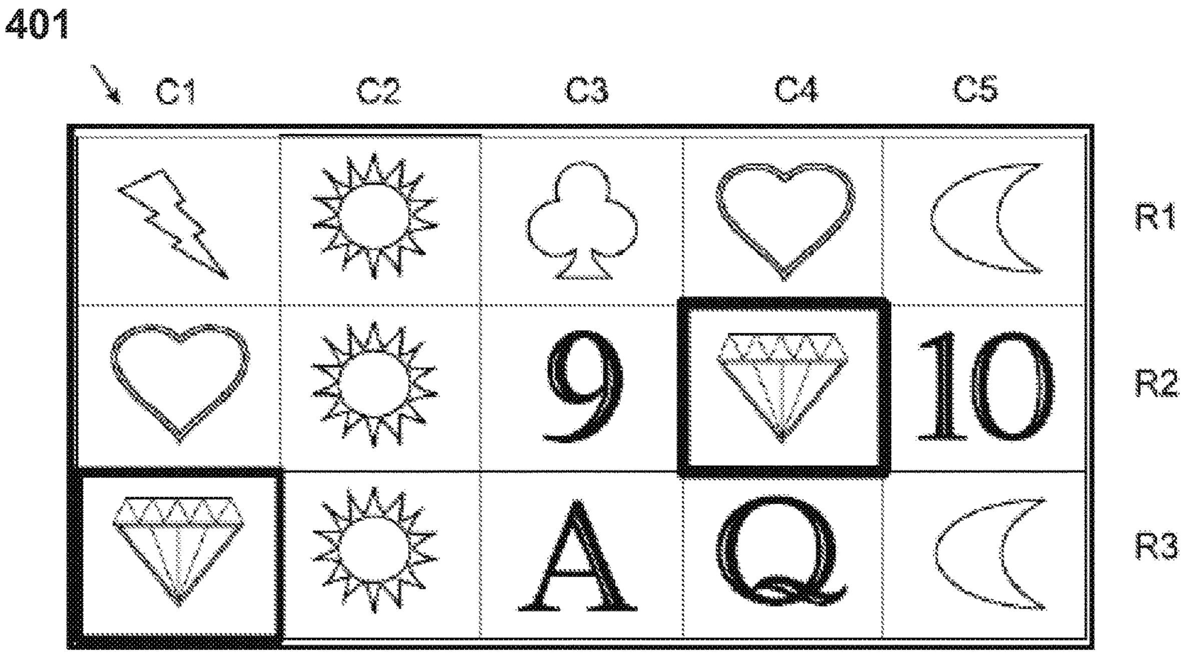
Figure 6E:
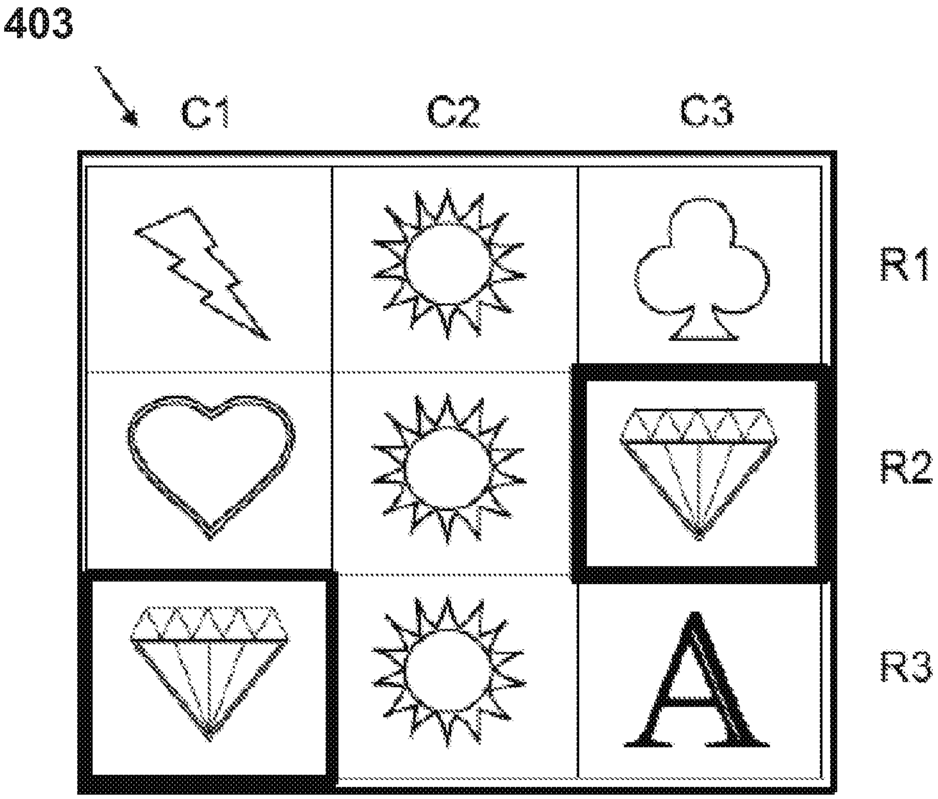

FIG. 6A, FIG. 6B, and FIG. 6C show a symbol-display-portion 399, FIG. 6D shows a symbol-display-portion 401, and FIG. 6E shows a symbol-display-portion 403. The symbol-display-portion 399, 401, 403 can include a matrix of symbols. The symbol-display-portion 399, 401, 403 can be displayed within a GUI. As an example, the symbol-display-portion 399, 403 can be displayed within the GUI 400 in lieu of the symbol-display-portion 402. In other words, the symbol-display-portion 402 can be arranged as a matrix of symbols other than a 5×3 matrix, such as a 5×4 matrix or a 3×3 matrix. The computing system can change the bank value 434 and/or output an award in response to a pre-defined symbol, such as a scatter symbol, landing within a symbol-display-portion, such as the symbol-display-portion 399, 401, 403. In accordance with the example embodiments represented by FIG. 6A to FIG. 6E, the predefined, scatter symbol is a diamond symbol. Other examples of a scatter symbol are possible.

In an example embodiment, a computing system is configured to establish and maintain a unique pool or wallet, called a "bank" or "personal bank", associated with event performance by a particular user. The computing system can associate the bank with the particular user's account. During event performance, the computing system receives payments (e.g., wagers) for an event performed by the particular user and determines contributions for the bank associated with the particular user. In this way, a value of the bank (i.e., a bank value) increases over time. The computing system can determine trigger events and/or winning patterns (e.g., winning paylines or payways) during event performance and output an award based on the bank value, a part of the bank value, or multiples of the bank value. The bank value can decrease in response to the computing system outputting an award based on the bank value.

In accordance with at least some embodiments, performing an event can include performing a slot event, such as a reel-based slot event. Performing the slot event can include outputting a symbol-display-portion including multiple columns and reels and/or a matrix configuration on the display. The columns can represent reels of a slot machine and can be animated to spin and simulate a mechanical slot machine. The slot event can include a ways-type event or a lines-type event. A ways-type event does not include pay lines, but simply requires that the same symbol is found on each of at least the first three reels in order to reward a user with a win. A lines-type event has specific pay lines that the same symbol must land on, on adjacent reels starting from the leftmost reel, to offer a win to a user. In accordance with these implementation, a wild symbol, different than the "same symbol" can be considered an instance of the same symbol if doing so would result in a win for the user.

The computing system 100, 100*a*, 100*b* can output symbols in a symbol-display-portion of a GUI, such as a GUI 400 shown in FIG. 4. As an example, the symbol-display-portion can be configured as a symbol-display-portion having a 5×4 matrix configuration, such as the symbol-display-portion 399 shown in FIG. 6A, FIG. 6B, and FIG. 6C. Such matrix configuration includes five columns and four rows. As an example, the symbol-display-portion can be configured as a symbol-display-portion having a 5×3 matrix configuration, such as the symbol-display-portion 402 shown in FIG. 4 and FIG. 6D. Such matrix configuration includes five columns and three rows. As yet another example, the symbol-display-portion can be configured as a symbol-display-portion having a 3×3 matrix configuration, such as the symbol-display-portion 403 shown in FIG. 6E. Such matrix configuration includes three columns and three rows. Each column of such matrices can represent a spinnable reel of a set of spinnable reels. Other examples of a matrix configuration of a symbol-display-portion are also possible.

Many different features other than that associated with a slot event performance may be provided by the example event.

A computing system, such as the computing system 100, 100*a*, 100*b* or the computing system 1000 shown in FIG. 10, can determine whether a contribution to the bank is to be made. Such determinations can be made for each performance of the event, or upon the occurrence of a specific event during performance of the event. In accordance with at least some embodiments, performing the event includes selecting symbols from a set of symbols that include a particular symbol defined as a scatter symbol. As an example, the scatter symbol can comprise a diamond symbol.

In accordance with at least some of those embodiments, the computing system outputs an award/prize linked to a user's bank if the scatter symbol appears within a symbol-display-portion of a graphical user interface at least a threshold number of time (e.g., five times) during the event. In at least some embodiments, each time the scatter symbol lands on the display less than the threshold number of times for an event, the computing system increases the bank value corresponding to the user. As another example, the computing system can increase the bank value by a particular percentage of a payment made by the user to perform the event times the number of instances that the scatter symbol landed on the display. As an example, the particular percentage can be 0.5 percent, 1.0 percent, 1.5 percent, 2.0 percent or some other percentage.

Table A shows a symbol layout of a symbol-based event in accordance with the example embodiments. This symbol layout represents symbols displayable within a 5×4 symbol-display-portion of a display. Table A shows that two of the symbols are Diamond symbols. A symbol layout can be referred to as a "symbols pattern" and vice versa.

TABLE A

| | | | | |
|---|---|---|---|---|
| Barrel | Rock | Lantern | Cart | Mineworker |
| Cart | Rock | Green Gem | Diamond | Red Gem |
| Diamond | Rock | Blue Gem | Tray | Mineworker |
| Cart | Rock | Mineworker | Spade | Barrel |

FIG. 6A also shows a symbol layout of a symbol-based event in accordance with the example embodiments. The symbol layout is contained within a 5×4 symbol-display-portion of a display. The computing system can highlight a particular symbol position and/or a symbol contained within the particular symbol position. As an example, the computing system can highlight each symbol position containing a symbol defined as a scatter symbol. FIG. 6A represents highlighting of two symbol positions containing scatter symbols (e.g., a diamond symbol) using thicker lines.

Figure 7:
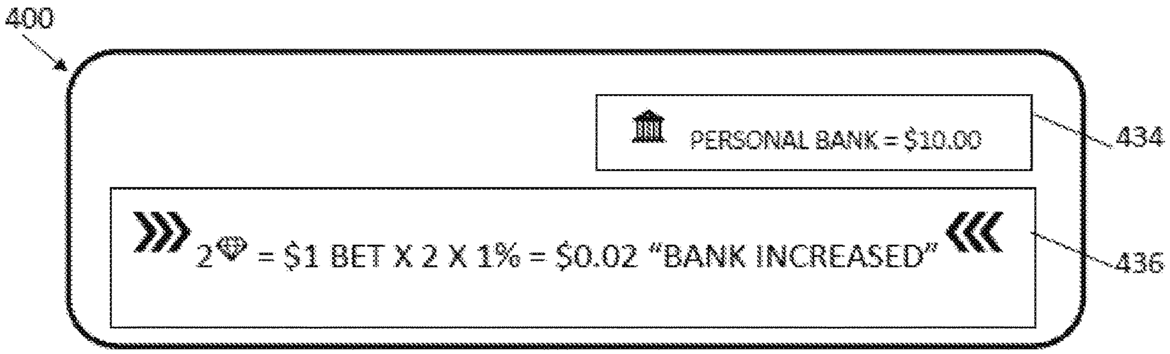
FIG. 7 illustrates a personal bank value and associated guidance displayed on the GUI including the personal bank value increasing based upon results during event performance, in accordance with the example embodiments.

Based on a ways-type win requiring the same symbol appearing in at least the three left-most reels and a symbol pattern shown above in Table A or in FIG. 6A, no win has occurred, as none of the same symbols appear on each of the first three reels. However, two diamond symbols have landed. If a user paid $1 to perform the event and the particular percentage for increasing the bank value is 1.0 percent, then an amount equal to the quantity of scatter symbols times the particular percentage of the user payment (i.e., 2×1% of $1, or $0.02) can be added to the user's bank. FIG. 7 show guidance 436 regarding such increase to the user's bank. In accordance with the example embodiments, the scatter symbol (e.g., the diamond symbol) can land within the symbol display portion often, leading to small, but continuous, increases in the bank value 434. As an example, a frequency of the scatter symbol landing within the symbol display portion less than the threshold amount of times that results in the computing system outputting an award based on the bank value 434 can be fifty percent, between a range of forty to fifty percent inclusive, between a range of thirty to forty percent inclusive, between a range of twenty to thirty percent inclusive, between a range of ten to twenty percent inclusive, between a range of one to ten percent inclusive, or some other range.

FIG. 7 illustrates a portion of the GUI 400 in accordance with the example embodiments. In particular, FIG. 7 shows the bank value 434 and the guidance 436. In this example, the guidance 436 indicates that the bank value 434 increased based upon results during event performance. The guidance 436 provides information to the user that two diamond symbols have landed and the bank value 434 has been increased by $0.02.

Figure 8:
FIG. 8 illustrates a personal bank value and associated guidance displayed on the GUI including the personal bank value being frozen based upon a free spin being awarded during event performance, in accordance with the example embodiments.

In accordance with at least some of the example embodiments, an event performed on a computing system configured to perform an event including use of a personal bank can include an event performed in response to automatic or manual selection of a free spin award (e.g., a "free spin event"). In accordance with at least some of those embodiments, the computing system can switch to a state in which use of the personal bank is inactive for each free spin event. In at least some embodiments, the bank value 434 does not increase while the computing system operates in the state in which use of the personal bank is inactive. After performance of a free spin event and receipt of a next user payment, the computing system can switch to a state in which use of the personal bank is active. In at least some embodiments, the bank value 434 can increase while the computing system operates in the state in which use of the personal bank is active. FIG. 8 illustrates a portion of the GUI 400 in accordance with the example embodiments. In particular, FIG. 8 shows the bank value 434 and associated guidance 436 including the bank value 434 being frozen based upon a free spin being awarded during event performance, in accordance with the example embodiments.

Table B shows prize values for awards that may be won by a user in accordance with the example embodiments. The prize values are based on the bank value 434 corresponding to the user. Each prize value has a static component corresponding to a respective quantity of symbols (e.g., a diamond symbol) that land on the display for an event. Each prize value also has a dynamic component corresponding to the bank value 434 corresponding to the user as a multiple thereof. Table B is for use with a symbol-display-portion 402 having at least 20 symbol positions, for example, a 5×4 symbol-display-portion 402 as shown in FIG. 6A, FIG. 6B, FIG. 6C.

TABLE B

| # Diamonds | Prize value (static value + multiplier × bank) |
|---|---|
| 20 | 20,000 + 1,000 × Bank |
| 19 | 10,000 + 500 × Bank |
| 18 | 5,000 + 250 × Bank |
| 17 | 2,000 + 100 × Bank |
| 16 | 1,000 + 50 × Bank |
| 15 | 500 + 25 × Bank |
| 14 | 250 + 12.5 × Bank |
| 13 | 200 + 10 × Bank |
| 12 | 150 + 7.5 × Bank |
| 11 | 100 + 5 × Bank |
| 10 | 75 + 4 × Bank |
| 9 | 50 + 3 × Bank |
| 8 | 25 + 2.5 × Bank |
| 7 | 20 + 2 × Bank |
| 6 | 15 + 1.5 × Bank |
| 5 | 10 + 1 × Bank |

A person having ordinary skill in the art will understand other embodiments can associate the prize values with a different symbol (e.g., a symbol other than a diamond symbol) or a different quantity of symbols counted to determine a prize value level (e.g., a diamond symbol and a heart symbol). Further, the skilled person will also understand that the prize value levels may be defined for quantities of symbols other than five to twenty symbols. Furthermore, the skilled person will also understand that different static values and/or different multiplier values can be used for the various prize value levels. Furthermore still, the skilled person will understand that the static value can represent various aspects, such as dollars (indicated with the $ sign), euros (indicated with the € symbol), pound sterling (indicated with the £ symbol), or otherwise.

Thus, for example, if the bank value 434 corresponding to the user indicates $10, and 5 diamond symbols land within the symbol-display-portion during an event, the computing system will output an award of $10+1×$10=$20. If 15 diamond symbols land within the symbol-display-portion during an event, the computing system will output an award of $500+25×$10=$750. If 20 diamond symbols land within the symbol-display-portion during an event (i.e., a maximum number of symbols based on the data in Table B), the computing system will output an award of $20,000+1,000×$10=$30,000.

Table C shows prize values for awards that may be won by a user in accordance with the example embodiments. The prize values are based on the bank value 434 corresponding to the user. Each prize value has a static component corresponding to a respective quantity of symbols (e.g., a diamond symbol) that land on the display for an event. Each prize value also has a dynamic component corresponding to the bank value 434 corresponding to the user as a multiple thereof. Table C is for use with a symbol-display-portion 402 having at least 15 symbol positions, for example, a 5×3 symbol-display-portion 401 as shown in FIG. 6D.

TABLE C

| # Diamonds | Prize value (static value + multiplier × bank) |
|---|---|
| 15 | 500 + 25 × Bank |
| 14 | 250 + 12.5 × Bank |
| 13 | 200 + 10 × Bank |
| 12 | 150 + 7.5 × Bank |
| 11 | 100 + 5 × Bank |
| 10 | 75 + 4 × Bank |
| 9 | 50 + 3 × Bank |
| 8 | 25 + 2.5 × Bank |
| 7 | 20 + 2 × Bank |
| 6 | 15 + 1.5 × Bank |
| 5 | 10 + 1 × Bank |

Table D shows prize values for awards that may be won by a user in accordance with the example embodiments. The prize values are based on the bank value 434 corresponding to the user. Each prize value has a static component corresponding to a respective quantity of symbols (e.g., a diamond symbol) that land on the display for an event. Each prize value also has a dynamic component corresponding to the bank value 434 corresponding to the user as a multiple thereof. Table B is for use with a symbol-display-portion 402 having at least 9 symbol positions, for example, a 3×3 symbol-display-portion 403 as shown in FIG. 6E.

TABLE D

| # Diamonds | Prize value (static value + multiplier × bank) |
|---|---|
| 9 | 500 + 3 × Bank |
| 8 | 250 + 2.5 × Bank |
| 7 | 100 + 2 × Bank |
| 6 | 75 + 1.5 × Bank |
| 5 | 50 + 1 × Bank |

In accordance with example embodiments, when the computing system 100, 100*a*, 100*b*, 1000 outputs at least a threshold quantify of scatter symbols (e.g., five or more diamond symbols) in the symbol-display-portion 402 of the GUI 400, the computing system outputs the associated prize, which is linked to the bank value 434. As an example, outputting the award can include outputting coins, bills, tokens, or a monetary amount in an account, such as a user account or bank account. After outputting the relevant prize based on the user's personal bank, the computing system 100, 100*a*, 100*b*, 1000 can reset the bank value 434. Additional, subsequent event performance can lead to increasing the bank value again.

Figure 9:
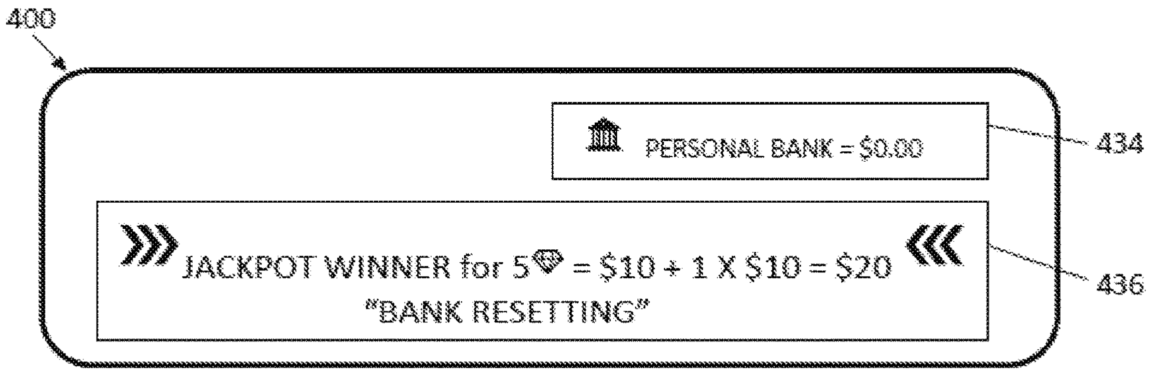
FIG. 9 illustrates a personal bank value and associated guidance displayed on the GUI including the personal bank value resetting based upon results during event performance, in accordance with the example embodiments.

FIG. 9 illustrates a portion of the GUI 400 in accordance with the example embodiments. In particular, FIG. 9 shows the bank value 434 and the guidance 436. In this example, the guidance 436 indicates that the bank value 434 is being reset to $0.00 based upon results during event performance. In at least some embodiments, resetting the bank value 434 can include resetting the bank value to a value other than zero and in some other form, such as euros, pounds sterling, tokens, or some other payment form.

In the example embodiments, by linking each of the prizes in the multi-level prize structure with the bank value 434, the computing system 100, 100*a*, 100*b*, 1000 can output a prize that is proportional to the bank value 434 for the particular user. However, as the user did not contribute to separate progressive prize pools, they need not feel as if they have contributed to any prize pools in the multi-level structure that are hoarding their funds. Instead, the computing system 100, 100*a*, 100*b*, 1000 outputs the bank value 434 back to the particular user with every one of the prizes, resulting in a more enjoyable and fair experience to the user. In addition, the user has been provided with a progressive prize experience, funded by their own contributions, and the user will know that another user cannot win the bank value 434, or prize fund.

An individual user can thus grow their own prizes locally that entices them, and that rewards them adequately, particularly for the top jackpot prize. Because all awards based on the bank value 434 are output to the user using the computing system displaying the bank value 434, the user need not feel as if their contributions are locked up in prizes they will rarely or ever win.

The example computer-implemented events can be performed by computing systems operated by a multitude of users at the same time. Every user will have a similar jackpot prize structure that is linked to a personal bank value, such that each computing system in use by those user(s) can output a respective bank value corresponding to that user. As a result, every user performing the event has a potential prize that is unique to them. This then provides a progressive prize experience to all users, while none of the normal wide area progressive technology is required to provide all users with a progressive prize experience.

The bank value 434 is uniquely associated with a user using the computing system displaying the bank value 434. The bank value 434 can be stored (e.g., in the bank values 362 of memory 114 shown in FIG. 3B) in relation to an account corresponding to the user. Accordingly, when the user stops performing events (e.g., logs off the computing system), the personal bank corresponding to that user is stored in and will be available to the user when the user returns to perform another event at a later stage. In at least some embodiments, the bank value 434 is transferrable across different computing systems, although such computing systems would typically be associated with a particular event provider to ensure the funding of the user's personal bank is suitably managed and tracked.

In at least some embodiments, the bank value 434 is always greater than zero when determining an amount of an award based on the bank value 434. As an example, during performance of an initial event or an event immediately subsequent to an event in which an award based on the bank value 434 was output, the bank value 434 can be based on a seed percentage (e.g., a percentage of a payment made to perform such event) different than a contribution percentage (e.g., a percentage of a payment used to determine a contribution to the bank value 434 based on a number of scatter symbols landing on the display). As an example, the seed percentage can be significantly larger than the contribution percentage. For instance, the seed percentage can be between fifty percent, and one hundred percent inclusive, and the contribution percentage can be one percent. As another example, the bank value 434 can decrease if the user decreases a payment made to perform an event and contributions to the bank value 434 based on a percent of payment(s) made since the last award based on the bank value 434 was output are not greater than the seed percentage of the decreased payment. In accordance with these examples, the computing system does not present a situation where the user wins a prize, but the value of the bank is zero, leading to a less-than ideal experience for the user. This initial value could be considered a seed value, and may be funded by an allocation from each payment placed by the user (for example, if the event is configured such that a prize is won once every 250 spins, the event may allocate 1/250 of the user's wager size to fund the seed value of the bank).

In accordance with the example embodiments, a computing system can be configured to perform events with a specific Return-to-User (RTU) value. This may be, for example, 96%. This means that, on average, 96% of all payments made to perform events are returned to users as some type of award or prize. The remaining 4% can be considered income to an operator of the computing system configured to perform the events. An example breakdown of awards funded by the 96% RTU, as a percentage of payments made by a user are discussed below.

As an example, 35% of all payments, on average, are returned to users for performance of base events. This means that normal event performance (for example pay-outs for landing three to five symbols on adjacent reels) will pay out a value of 35% of all event performance payments.

As another example, 26% of all payments, on average, are returned to users during performance of free spins awarded to the users. This means that the winnings of users during free spin rounds are equal to 26% of all event performance payments.

As yet another example, 25% of all payments, on average, are returned to users as a non-bank jackpot. The static component of all jackpot prizes may total 25% of all event performance payments.

As still yet another example, 10% of all payments, on average, are returned to users as personal bank awards. Thus, 10% of the payments made by users are returned as part of prizes where the bank value is multiplied by some amount. This 10% may be made up of 1% bank seed value (i.e., 1% of wagers are used to seed a user's bank value after depletion), and 4% may go towards increasing a user's bank account. Then, on average, a 2× multiplier may be applied to a user's bank value during wins of multi-level prizes, resulting in the 4% in a user's bank needing an additional 4% to fund the actual prize, thus becoming 8%. In addition, the 1% seed value will also be multiplied along with the bank value, adding another 1%. This then totals the 10% Bank RTU.

A person having ordinary skill in the art will understand that the computing system can be configured so that, despite a user's own prize pool being used to determine the size of prizes they win, the event's RTU contribution caters for this, and the prizes are still funded by the user's contribution to the various components. Effectively, as the amount of user contributions the user has added to their bank, the more they have contributed to the other appropriate elements during event performance. Despite the prizes being offered being related to a user's bank value, the event's RTU value is configured to remain as specified.

The skilled person will also understand that the RTU distribution discussed above is provided for illustrative purposes only, and can be changed or adapted to cater for various example embodiments.

Some jackpot prizes may only have a static component and may not award the user the bank value 434 back. However, it is envisaged that prizes that incorporate the bank value 434 should be awarded frequently enough that a user experiences event performance favorably. Some jackpot prizes may award a user with only a part of the bank value 434 back, for example half or a quarter thereof. Then, the remainder of the user's bank value will remain for return to the user at a later stage. A combination of prizes, including both a static component and a partial bank value award, is also possible.

In accordance with at least some of the example embodiments, the computing system 100, 100*a*, 100*b*, 1000 can "freeze" the bank value 434 when the computing system enters a free spin round (e.g., the computing system performs one or more free spins and/or enters the state in which use of the personal bank is inactive for each free spin event. As an example, freezing the bank value 434 includes fixing the bank value at its current value even if additional scatter symbols land on the display during the free spin. As another example, freezing the bank value 434 includes fixing the bank value at its current value if no award based on the bank value 434 is earned during the free spin event or decreasing the bank value based on the award based on the bank value 434 is earned during the free spin event. In at least some embodiments, each time a scatter symbol lands on the display during a free spin event, the computing system outputs an award based on the bank value 434. As an example, when four scatter symbols land on the display during a free spin event, the computing system outputs an award equal to four times the bank value 434.

In accordance with at least some of the example embodiments, at the end of the free spin round, the computing system resets the bank value 434, and increasing of the bank value 434 begins anew. As before, the RTU allocation may be configured so that, as the bank value 434 has increased, so have user contributions for awards output during performance of a free spin. In this way, again, the RTU value of the event may remain accurate.

In accordance with at least some of the example embodiments, the bank value 434 corresponds to a value of some of the awards that can be output by the computing system. This can result in a favorable user experience. Hoarding of prize funds is avoided, as the user is rewarded with the bank value 434 at, possibly, every trigger of a free spin round (as long as the required scatter symbol lands).

In accordance with at least some of the example embodiments, contributions to the bank value 434 can be made during each event. For example, a contribution to the bank value 434 can be made for each spin, or for each occurrence of a trigger conditions as per other example embodiments described above.

Notably, the functions of establishing a personal bank having a personal bank value corresponding to a user and a user ID, outputting a GUI to a display for performing a symbol-based event, determining trigger events during event performance, outputting updates to the GUI based upon the personal bank value, determining whether to change the personal bank value, and outputting guidance to a user of the symbol-based event necessitate computer implementation. Without computer implementation, managing progressive awards based on proportions of a user-specific personal bank value would be impractical or impossible. Similarly, managing personal bank values across multiple events on multiple computer platforms would also be impractical or impossible. In contrast, the computer implementation herein allows the linking of various prizes to a proportion of a progressive value, and the awarding to a user of their banked amount, across multiple events on multiple platforms. Consequently, these features of the disclosure herein would not exist but for computer technology.

Particularly, the embodiments herein solve a technical problem of how to provide a favorable experience while performing events with a computing system and avoiding the hoarding of prize funds. The functions of establishing a personal bank having a personal bank value corresponding to a user and a user ID, outputting a GUI to a display for performing a symbol-based event, determining trigger events during event performance, outputting updates to the GUI based upon the personal bank value, determining whether to change the personal bank value, and outputting guidance to a user of the symbol-based event would be prohibitively complex and expensive to implement on a traditional machine with mechanical reels. In effect, the present approach can be seen as providing implementations which increase the number and variety of possible outcomes and favorable experiences in a reel-based slot event.

Further, these features are an improvement to reel-based event technology. Since the symbols appearing on each reel are fixed and cannot be changed during mechanical reel-based outcome events, the functions of outputting updates to the GUI based upon the personal bank value, determining whether to change the personal bank value, and outputting guidance to a user of the symbol-based event could not appear in such outcome events. Due to this technological limitation, users can become disinterested in these basic reel-based outcome events. Computer implementation, however, facilitates the integration of these features into reel-based outcome events, resulting in outcome event dynamics that would otherwise be unavailable. Consequently, the disclosure herein is a technological improvement to reel-based outcome events.

Furthermore, at least some of the example embodiments can include performing the functions of establishing a personal bank having a personal bank value corresponding to a user and a user ID, outputting a GUI to a display for performing a symbol-based event, determining trigger events during event performance, outputting updates to the GUI based upon the personal bank value, determining whether to change the personal bank value, and outputting guidance to a user of the symbol-based event using a server computing system and client computing system using a communication network to carry communications including instructions and/or data to carry out the functions. As an example, the client computing system can include user-selectable controls that are selectable to trigger performance of an outcome event. Moreover, a processor at the client computing system can receive inputs from devices operatively coupled to the processor, such as an acceptor, and can control devices outside of the processor during performance of the outcome event, such as a display or speaker. Furthermore still, in some embodiments, a processor at the server computing system can determine an outcome for an outcome event and transmit data for displaying a representation of the outcome event on a display screen at the client computing system. In at least some embodiments, the data for displaying a representation of the outcome event can include an index value to some content already stored at the client computing system so that the server computing system does not need to transmit that content each time the client computing system is to display that content during performance of an outcome event. For example, the index value can include a value indicative of a particular animation of the animations 356 to display when the client computing system is operating in a particular operating state such as the operating state for the awarding of a progressive prize of the freezing of the personal bank value shown in FIG. 8 and FIG. 9. As another example, the index value can include a value indicative of a particular reel set to display within the symbol-display-portion 399, 401, 402, 403.

Next, FIG. 10 is a block diagram of a computing system 1000 configured for providing symbol-based events having personal bank features for progressive awards in accordance with the example embodiments. In some implementations, the computing system 1000 can include a computing platform 1002 (i.e., one or more computing platforms). The computing platform 1002 can be configured to communicate with a remote platform 1004 (i.e., one or more remote platforms) according to a client/server architecture, a peer-to-peer architecture, and/or other architectures. The remote platform 1004 can be configured to communicate with other remote platforms via the computing platform 1002 and/or according to a client/server architecture, a peer-to-peer architecture, and/or other architectures. Users can access the computing system 1000 via the remote platform 1004. According to some embodiments, one or more of from among the computing platform 1002, the remote platform 1004, and/or other components of computing system 1000 can be the same as or similar to one or more components of the computing system 100 of FIG. 1B, the computing system 100*a* and/or the computing system 100*b* of FIG. 2, and/or other computing resources disclosed herein.

The computing platform 1002 can be configured by machine-readable instructions 1006. The machine-readable instructions 1006 can include one or more instruction modules. The instruction modules can include computer program modules. The instruction modules can include one or more from among: the user interface outputting module 1008, the trigger event determination module 1010, the update outputting module 1012, the result determination module 1014, the bank establishing module 1016, the signal outputting module 1018, the computer-readable memory reading module 1020, the award outputting module 1022, or one or more other instruction modules.

The user interface outputting module 1008 can be configured to output a graphical user interface a display (e.g., the display 110, 110*a*, 110*b*) of a computing system configured to perform a symbol-based event (e.g., the computing system 100, 100*a*, 100*b*, 1000). As an example, the user interface outputting module 1008 can output any GUI shown in the drawings and/or described in this description.

The trigger event determination module 1010 can be configured to determine a trigger event corresponding to a user accessing the symbol-based event at the computing system 1000.

A processor 1028 of the computing platform 1002 can monitor one or more inputs to the processor 1028. The processor 1028 can determine the trigger event based on a signal appearing on one input to the processor or a combination of signals appearing on multiple inputs to the processor. The input signals may appear asynchronously on the inputs to the processor 1028.

Determining the trigger event can include determining a login credential received at the computing system corresponds to the user. Determining the trigger event can include determining a casino card corresponding to the user was swiped through a card reader corresponding to the computing system. Determining the trigger event can include determining a biometric identifier received at the computing system corresponds to the user. By way of non-limiting example, the login credential can include one or more from among a mobile phone number corresponding to the user, an e-mail address corresponding to the user, a biometric identifier corresponding to the user, a globally unique identifier corresponding to the user, a password assigned to the user, or a confirmation from a multi-factor authentication application. The user identifier associated with the user can be configured as metadata corresponding to the personal bank corresponding to the user. For example, a user identifier "218" discussed with respect to a database record below can be metadata corresponding to the user's name and/or the personal bank corresponding to that user.

As another example, determining the trigger event can include the computing system 1000 receiving a selection of the symbol-based event from among a suite of selectable events performable using the computing system 1000 while the user is logged into the computing system 1000.

The computing system 1000 can include a user-selectable control selectable to generate the first activation request.

The update outputting module 1012 can be configured to output, to the display a first update to the GUI, the first update based on a personal bank value corresponding to the user. The personal bank can include the personal bank value (e.g., the bank value 434) corresponding to the user and a user identifier associated with the user. The first update can indicate the personal bank value. The progressive bank award can include an award proportional to the personal bank value corresponding to the user. By way of non-limiting example, the progressive bank award can be based upon one or more from among the personal bank value, a portion of the personal bank value, or a multiple of the personal bank value.

The computing system 1000 can be configured to interface with multiple computing devices to perform different instances of the symbol-based event with reference to the personal bank value corresponding to the user. As an example, the multiple computing devices can include any combination of two or more computing devices selected from among: a desktop computer, a laptop computer, a tablet device, a smartphone, or a client computing device. Other examples are possible.

The update outputting module 1012 can be configured to output, to the display in response to the first activation request, a second update to the GUI. The second update can include at least the first result of performing the first instance of the symbol-based event.

The update outputting module 1012 can be configured to output, to the display in response to a second activation request (such as the second activation request discussed below with respect to the result determination module 1014), a second update to the GUI. One or more of the examples in the following paragraph are applicable to implementations including the update outputting module 1012 or other implementations including a processor such as the processor 112, 112*a*, 112*b*, 1028.

As an example, outputting the second update to the GUI can further include outputting, in a symbol-display-portion of the GUI, an animation showing a rearranging of symbols and at least a portion of the animation stopping within the set of symbols selected for the first instance of the symbol-based event displayed in the symbol-display-portion. As another example, outputting the second update to the GUI can include outputting an indication of a winning outcome based on a particular pattern of symbols landing within the symbol-display-portion. As yet another example, outputting the second update to the GUI can include outputting an indication that a winning outcome based on particular patterns of symbols did not occur. As yet another example, outputting the second update to the GUI can include outputting an indication of an award earned for a winning outcome displayed in the symbol-display-portion. As still yet another example, outputting the second update to the GUI can include outputting user guidance indicating how to use the computing system to be eligible for increasing the personal bank value. As yet another example, outputting the second update to the GUI can further include outputting user guidance indicating how to use the computing system to be eligible to win an award based upon the personal bank value.

The guidance output by a processor, such as guidance output as part of the second update, can include textual guidance, such as the guidance 436 shown and/or discussed with respect to FIG. 4, FIG. 7, FIG. 8 or FIG. 9. Alternatively, the guidance can be non-textual. As an example, the non-textual guidance can include a changed visual appearance, such as removing highlighting from a USC displayed within the GUI when the USC is inactive or adding highlighting to the USC displayed within the GUI when the USC is active. As another example, the non-textual guidance can include an audible sound output by the computing system.

The symbol-display-portion can be arranged as a set of multiple reels. The animation showing a rearranging of symbols can include an animation showing the set of multiple reels spinning within the symbol-display-portion. The particular pattern of symbols landing within the symbol-display-portion can include a particular payline or a particular pay way.

The result determination module 1014 can be configured to determine, in response to a first activation request, a first result of performing a first instance of the symbol-based event. The first result can indicate whether to change the personal bank value based on a set of symbols selected for the first instance of the symbol-based event.

In accordance with at least some embodiments, the personal bank value equals a predefined default value if performing the first instance of the symbol-based event includes performing an initial instance of the symbol-based event for the user. Alternatively, the personal bank value is based on a respective result of performing one or more instances of the symbol-based event for the user prior to performing the first instance of the symbol-based event if performing the first instance of the symbol-based event includes performing an instance of the symbol-based event for the user after performing the initial instance of the symbol-based event for the user.

In accordance with at least some embodiments, the first update can indicate the personal bank is inactive if the first activation request includes a free activation request.

In accordance with at least some embodiments, the first update can indicate the personal bank is active if the first activation request is conditioned on the computing system receiving a payment to perform the first instance of the symbol-based event.

In accordance with at least some embodiments, the first activation request can include a symbol arrangement request. The symbol arrangement request can include a symbol spin request.

In accordance with at least some embodiments, determining the first result of performing the first instance of the symbol-based event can include determining whether the computing system is operating in a state in which a bank incrementing feature is disabled. For example, as discussed above, the bank value 434 can be frozen during performance of a free-spin event.

Additionally or alternatively, determining the first result of performing the first instance of the symbol-based event can include determining whether the first result includes a symbol pattern win. Additionally or alternatively, determining the first result of performing the first instance of the symbol-based event can include determining whether the first result includes a progressive bank award. Additionally or alternatively, determining the first result of performing the first instance of the symbol-based event can include determining whether to increment the personal bank value.

Determining the first result of performing the first instance of the symbol-based event can further include determining whether the subset of symbols displayed according to the particular arrangement includes a particular pattern of symbols defined as a winning pattern. The particular patter of symbols can include a payline or a payway. The first result can indicate whether to change the personal bank value based on a set of symbols selected for the first instance of the symbol-based event. The set of symbols can include multiple instances of a particular symbol. Each symbol in the set of symbols can be represented numerically within the set of symbols. Each symbol in the set of symbols can correspond to a graphical image displayable in the symbol-display-portion.

The result determination module 1014 can be configured to determine, in response to a second activation request, a second result of performing a second instance of the symbol-based event. The second activation request can occur after the first activation request and the first instance of the symbol-based event. The second activation request can occur before the first activation request and the first instance of the symbol-based event. The second result can indicate whether to change the personal bank value based on a second set of symbols selected for the second instance of the symbol-based event. The second update can include at least the second result of performing the second instance of the symbol-based event.

A bank establishing module 1016 can be configured to establish, by the computing system within a computer-readable memory, a personal bank corresponding to the user. As an example, establishing the bank can include adding a new record into a database table stored in the memory. In at least some implementations, the database can include a relational database arranged in accordance with a MICROSOFT® SQL server database management system, an IBM® DB2® database, or an ORACLE® database. An another example, a processor can determine user information corresponding to a user of the computing system 1000 and generate "Insert Into" and "Values" statements for providing to the database to establish a personal bank. Examples of such statements include:

INSERT INTO Banks (UserID, UserName, Currency, BankValue, BankStatus), and VALUES ('218', 'John Doe', 'Euros', '0.00', 'Frozen').

A signal outputting module 1018 can be configured to output, in response to the first activation request, a particular audio signal if the first result of performing the first instance of the symbol-based event includes a winning outcome. As an example, the first result can include a result in which the bank value 434 is increased in response performing the first instance of the symbol-based event. As another example, the first result can include a result in which the bank value 434 is used in determining an award output in response performing the first instance of the symbol-based event. As yet another example, the first result can include a result in which an award is output because the symbol-display-portion shows one or more particular winning patterns of symbols in response performing the first instance of the symbol-based event The computer-readable memory reading module 1020 can be configured to read from and/or writing to a computer-readable memory of the computing system 1000 for performing multiple operations for a series of instances of the symbol-based event. The processor 1028 can be configured to read the computer-readable memory to determine the personal bank value (e.g., the bank value 434) and write to the computer-readable memory to change the personal bank value. As an example, an operation of the multiple operations can include increasing the personal bank value corresponding to the user. As another example, an operation of the multiple operations can include resetting the personal bank value (e.g., the bank value 434) corresponding to the user to a default value. As yet another example, an operation of the multiple operations can include freezing the personal bank value corresponding to the user. The personal bank value corresponding to the user can be contained within a personal bank designated in the computer-readable memory. An operation performed for an earlier instance of the series can be configured to impact a result of a later instance of the series.

The award outputting module 1022 can be configured to output an award if the subset of symbols displayed according to the particular arrangement includes the particular pattern of symbols defined as the winning pattern.

In accordance with at least some embodiments, initiation of the first instance of the symbol-based event occurs in response to the first activation request. In accordance with at least some of those embodiments, the computing system includes a user-selectable control selectable to generate the first activation request. As an example, the user-selectable control can be embodied within the GUI. As another example, the user-selectable control can be embodied within hardware remote from the GUI.

In accordance with at least some embodiments, determining the first result of performing the first instance of the symbol-based event can include determining a subset of symbols randomly selected from a set of symbols for displaying in a particular arrangement within a symbol-display-portion of the GUI. The first result can include outputting an award if the subset of symbols includes the particular symbol at least a threshold amount of times or the first result includes increasing the personal bank value if the subset of symbols does not include the particular symbol at least the threshold amount of times.

In accordance with at least some embodiments, the GUI can include a symbol-display-portion.

In accordance with at least some embodiments, the computing platform 1002, the remote platform 1004, and/or the external resources 1024 can be operatively linked via one or more electronic communication links. For example, such electronic communication links can be established, at least in part, via a network such as the Internet and/or other networks. It will be appreciated that this is not intended to be limiting, and that the scope of this disclosure includes implementations in which the computing platform 1002, the remote platform 1004, and/or the external resources 1024 can be operatively linked via some other communication media.

A given remote platform 1004 can include one or more processors configured to execute computer program modules. The computer program modules can be configured to enable an expert or user associated with the given remote platform 1004 to interface with the computing system 1000 and/or the external resources 1024, and/or provide other functionality attributed herein to the remote platform 1004. By way of non-limiting example, a given remote platform 1004 and/or a given computing platform 1002 can include one or more of a slot machine, a server, a desktop computer, a laptop computer, a handheld computer, a tablet computing platform, a NetBook, a smart phone, a gaming console, and/or other computing platforms.

The external resources 1024 can include sources of information outside of the computing system 1000, external entities participating with the computing system 1000, and/or other resources. In some implementations, some or all of the functionality attributed herein to the external resources 1024 can be provided by resources included in the computing system 1000.

The computing platform 1002 can include electronic storage 1026 (e.g., one or more memories), a processor 1028 (i.e., one or more processors), and/or other components. The computing platform 1002 can include communication lines, or ports to enable the exchange of information with a network and/or other computing platforms. Illustration of the computing platform 1002 in FIG. 10 is not intended to be limiting. The computing platform 1002 can include a plurality of hardware, software, and/or firmware components operating together to provide the functionality attributed herein to the computing platform 1002. For example, the computing platform 1002 can be implemented by a cloud of computing platforms operating together as the computing platform 1002.

The electronic storage 1026 can comprise non-transitory storage media that electronically stores information. The electronic storage media of the electronic storage 1026 can include one or both of system storage that is provided integrally (i.e., substantially non-removable) with the computing platform 1002 and/or removable storage that is removably connectable to the computing platform 1002 via, for example, a port (e.g., a USB port, a FIREWIRE® port, etc.) or a drive (e.g., a disk drive, etc.). The electronic storage 1026 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 1026 can include one or more virtual storage resources (e.g., cloud storage, a virtual private network, and/or other virtual storage resources). The electronic storage 1026 can store software algorithms, information determined by the processor 1028, information received from computing platform 1002, information received from remote platform 1004, and/or other information that enables the computing platform 1002 to function as described herein.

The processor 1028 can be configured to provide information processing capabilities in the computing platform 1002. As such, the processor 1028 can include one or more of a digital processor, an analog processor, a digital circuit designed to process information, an analog circuit designed to process information, a state machine, and/or other mechanisms for electronically processing information. In some implementations, the processor 1028 can include a plurality of processing units. These processing units can be physically located within the same device, or the processor 1028 can represent processing functionality of a plurality of devices operating in coordination. The processor 1028 can be configured to execute modules 1008, 1010, 1012, 1014, 1016, 1018, 1020, and/or 1022, and/or other modules. The processor 1028 can be configured to execute modules 1008, 1010, 1012, 1014, 1016, 1018, 1020, and/or 1022, and/or other modules by software; hardware; firmware; some combination of software, hardware, and/or firmware; and/or other mechanisms for configuring processing capabilities on the processor 1028. As used herein, the term "module" can refer to any component or set of components that perform the functionality attributed to the module. This can include one or more physical processors during execution of processor readable instructions, the processor readable instructions, circuitry, hardware, storage media, or any other components.

It should be appreciated that although modules 1008, 1010, 1012, 1014, 1016, 1018, 1020, and/or 1022 are illustrated in FIG. 10 as being implemented within a single processing unit, in implementations in which the processor 1028 includes multiple processing units, one or more of modules 1008, 1010, 1012, 1014, 1016, 1018, 1020, and/or 1022 can be implemented remotely from the other modules. The description of the functionality provided by the different modules 1008, 1010, 1012, 1014, 1016, 1018, 1020, and/or 1022 described below is for illustrative purposes, and is not intended to be limiting, as any of modules 1008, 1010, 1012, 1014, 1016, 1018, 1020, and/or 1022 can provide more or less functionality than is described. For example, one or more of modules 1008, 1010, 1012, 1014, 1016, 1018, 1020, and/or 1022 can be eliminated, and some or all of its functionality can be provided by other ones of modules 1008, 1010, 1012, 1014, 1016, 1018, 1020, and/or 1022. As another example, the processor 1028 can be configured to execute one or more additional modules that can perform some or all of the functionality attributed below to one of modules 1008, 1010, 1012, 1014, 1016, 1018, 1020, and/or 1022.

Next, FIG. 11A is a flow chart showing a set 1100 of functions of that can be carried out using a computing system (e.g., the computing system 100 of FIG. 1A, the computing system 100*a* and/or the computing system 100*b* shown in FIG. 2, the computing system 1000 of FIG. 10, the computing platform 1002, the remote platform 1004, and/or other computing resources). A method of the example embodiments can include one or more functions of the set 1100 and/or a portion of one or more functions of the set 1100. Additionally, the order in which the functions of set 1100 are illustrated in FIG. 11A and described below is not intended to be limiting.

Accordingly, a method based on function(s) of the set 1100 can include a computer-implemented method involving a software application executed by the computing system (e.g., computing system 100 of FIG. 1B including a communication interface 102, a user interface 104, and a logic module 106, a system bus, network, or other connection mechanism 108), the computing system 1000 of FIG. 10, the computing platform 1002, the remote platform 1004, and/or other computing resources) with and/or in communication with a display screen. Execution of the software application can include graphically displaying, on vertical symbol display segments of the display screen, animations that simulate spinning a plurality of reels. A memory (e.g., the memory 114, 114*a*, 114*b*, the electronic storage 1026 of the computing platform 1002, and/or other memories) can store, a global symbol group including a plurality of symbols. Subsets of the global symbol group and/or the plurality of symbols are displayable in a respective vertical symbol display segment of the display screen.

Block 1102 includes outputting a graphical user interface to a display of a computing system configured to perform a symbol-based event. The function(s) of block 1102 can be performed by a processor configured by machine-readable instructions including a module that is the same as or similar to user interface outputting module 1008, in accordance with the example embodiments. As an example, the processor can output a graphical user interface (e.g., GUI 400) to a display (e.g., display 110, 110*a*, 110*b*) of a computing system 100, 100*a*, 100*b* configured to perform a symbol-based event.

Next, block 1104 includes determining a trigger event corresponding to a user accessing the symbol-based event at the computing system. The function(s) of block 1104 can be performed by a processor configured by machine-readable instructions including a module that is the same as or similar to trigger event determination module 1010, in accordance with the example embodiments. As an example, the processor can determine a login credential received at the computing system 100, 100*a*, 100*b*, or determine the selection of a symbol-based event from among a suite of events.

Next, block 1106 includes outputting, to the display a first update to the GUI, the first update based on a personal bank value corresponding to the user. The function(s) of block 1106 can be performed by a processor configured by machine-readable instructions including a module that is the same as or similar to update outputting module 1012, in accordance with the example embodiments. As an example, the processor can output to the GUI that the personal bank is inactive and/or the current value of the bank value 434.

Next, block 1108 includes determining, in response to a first activation request, a first result of performing a first instance of the symbol-based event. The first result can indicate whether to change the personal bank value based on a set of symbols selected for the first instance of the symbol-based event. The function(s) of block 1108 can be performed by a processor configured by machine-readable instructions including a module that is the same as or similar to result determination module 1014, in accordance with the example embodiments. As an example, the processor can determine a symbol pattern win or determine a progressive bank award based upon event performance. The symbol pattern win can include a lines-type win and/or a ways-type win. The progressive bank award can be based on the set of symbols including a scatter symbol (e.g., a diamond symbol) at least a threshold amount of times.

Next, block 1110 includes outputting, to the display in response to the first activation request, a second update to the GUI. The second update can include at least the first result of performing the first instance of the symbol-based event. The function(s) of block 1110 can be performed by a processor configured by machine-readable instructions including a module that is the same as or similar to update outputting module 1012, in accordance with the example embodiments. As an example, the processor can output to the display a prize award amount and guidance to the user for subsequent event performance.

Next, FIG. 11B shows block 1112. In accordance with the example embodiments, a method including one or more functions of the set 1100 can include performing a function corresponding to block 1112.

Block 1112 includes establishing, by the computing system within a computer-readable memory, a personal bank corresponding to the user. The function(s) of block 1112 can be performed by a processor configured by machine-readable instructions including a module that is the same as or similar to the bank establishing module 1016, in accordance with the example embodiments. As an example, the processor can establish a personal bank, within a memory of the computing system. The personal bank can include a bank value corresponding to the user and a user identifier associated with the user. The bank value can be stored with the bank values 362.

Next, FIG. 11C shows block 1114. In accordance with the example embodiments, a method including one or more functions of the set 1100 can include performing a function corresponding to block 1114.

Block 1114 includes outputting, in response to the first activation request, a particular audio signal if the first result of performing the first instance of the symbol-based event includes a winning outcome. The function(s) of block 1114 can be performed by a processor configured by machine-readable instructions including a module that is the same as or similar to signal outputting module 1018, in accordance with the example embodiments. As an example, the processor can output to a speaker a first particular audio signal to generate a first particular sound when reels are spinning on the display 110. As another example, the processor can output to a speaker a second particular audio signal to generate a second particular sound in response to winning a particular award, such as a progressive jackpot based on a person bank.

Next, FIG. 11D shows block 1116. In accordance with the example embodiments, a method including one or more functions of the set 1100 can include performing a function corresponding to block 1116.

Block 1116 includes reading from and/or writing to a computer-readable memory of the computing system for performing multiple operations for a series of instances of the symbol-based event. The function(s) of block 1116 can be performed by a processor configured by machine-readable instructions including a module that is the same as or similar to computer-readable memory reading module 1020, in accordance with the example embodiments. As an example, the processor can read the current value of the personal bank for a user from the memory 114, 114*a*, 114*b* or the electronic storage 1026, and subsequently write an updated value of the personal bank for a user based upon outcomes of event performance.

Next, FIG. 11E shows block 1118. In accordance with the example embodiments, a method including one or more functions of the set 1100 can include performing a function corresponding to block 1118.

Block 1118 includes outputting an award if the subset of symbols displayed according to the particular arrangement includes the particular pattern of symbols defined as the winning pattern. The function(s) of block 1118 can be performed by a processor configured by machine-readable instructions including a module that is the same as or similar to award outputting module 1022, in accordance with the example embodiments. As an example, the processor can output an award such as a progressive prize that is based upon a user's personal bank value when a particular number of scatter symbols land during performance of an event.

Next, FIG. 11F shows block 1120 and a block 1122. In accordance with the example embodiments, a method including one or more functions of the set 1100 can include performing a function corresponding to block 1120 and/or a function corresponding to block 1122.

Block 1120 includes determining, in response to a second activation request, a second result of performing a second instance of the symbol-based event. The second result can indicate whether to change the personal bank value based on a second set of symbols selected for the second instance of the symbol-based event. The function(s) of block 1120 can be performed by a processor configured by machine-readable instructions including a module that is the same as or similar to result determination module 1014, in accordance with the example embodiments. As an example, the processor can determine whether to award a progressive prize to the user and reset the personal bank value when at least a threshold number of scatter symbols land during performance of an event.

Next, block 1122 includes outputting, to the display in response to the second activation request, a second update to the GUI. The second update can include at least the second result of performing the second instance of the symbol-based event. The function(s) of block 1122 can be performed by a processor configured by machine-readable instructions including a module that is the same as or similar to update outputting module 1012, in accordance with the example embodiments. As an example, the processor can output an updated personal bank value along with corresponding guidance information to the user for the performance of a subsequent event.

IV. Conclusions

While one or more disclosed functions have been described as being performed by certain computing systems (e.g., the computing system 100, 100*a*, 100*b*, 1000, the computing system 100*a*, or the computing system 100*b*), one or more of the functions can be performed by any entity, including but not limited to those described herein. As such, while this disclosure includes examples in which the computing system 100*a* performs select functions and sends data to the computing system 100*b*, such that the computing system 100*b* can perform complementing functions and receive the data, variations to those functions can be made while adhering to the general server-client dichotomy and the scope of the disclosed machines, computing systems, and methods.

For example, rather than the computing system 100*a* sending select data (e.g., a symbol set, a value, etc.) to the computing system 100*b*, such that the computing system 100*b* can generate and display appropriate images, the computing system 100*a* can generate the images and send them to the computing system 100*b* for display. Indeed, it will be appreciated by one of ordinary skill in the art that the "break point" between the server computing system's functions and the client computing system's functions can be varied.

Furthermore, the functions described throughout this can be performed in an order different than an order of functions (if any) described herein or shown in the drawings. Additionally, embodiments in the form of a method can include one or more of the functions described herein or shown in the drawings.

Furthermore still, while examples have been described in terms of select embodiments, alterations and permutations of these embodiments will be apparent to those of ordinary skill in the art. Other changes, substitutions, and alterations are also possible without departing from the disclosed machines, computing systems, and methods in their broader aspects as set forth in the claims below.

Finally, one or more embodiments described above can relate to one or more of the following enumerated example embodiments (EEE).

EEE A1 is a computing system comprising: a processor configured by machine-readable instructions to: output a graphical user interface (GUI) to a display of a computing system configured to perform a symbol-based event; determine a trigger event corresponding to a user accessing the symbol-based event at the computing system; output, to the display a first update to the GUI, the first update based on a personal bank value corresponding to the user; determine, in response to a first activation request, a first result of performing a first instance of the symbol-based event, the first result indicating whether to change the personal bank value based on a set of symbols selected for the first instance of the symbol-based event; and output, to the display in response to the first activation request, a second update to the GUI, the second update including at least the first result of performing the first instance of the symbol-based event.

EEE A2 is the computing system of EEE A1, wherein the personal bank value equals a predefined default value if performing the first instance of the symbol-based event includes performing an initial instance of the symbol-based event for the user, or the personal bank value is based on a respective result of performing one or more instances of the symbol-based event for the user prior to performing the first instance of the symbol-based event if performing the first instance of the symbol-based event includes performing an instance of the symbol-based event for the user after performing the initial instance of the symbol-based event for the user.

EEE A3 is the computing system of any one of EEE A1 to A2, wherein the processor is further configured by machine-readable instructions to: establish, by the computing system within a computer-readable memory, a personal bank corresponding to the user, wherein the personal bank includes the personal bank value corresponding to the user and a user identifier associated with the user; read the computer-readable memory to determine the personal bank value; and write to the computer-readable memory to change the personal bank value.

EEE A4 is the computing system of EEE A3, wherein the user identifier associated with the user is configured as metadata corresponding to the personal bank.

EEE A5 is the computing system of any one of EEE A1 to A4, wherein the machine-readable instructions to determine the trigger event include machine-readable instructions to perform one or more from among: determine a login credential received at the computing system corresponds to the user; determine a casino card corresponding to the user was swiped through a card reader corresponding to the computing system; determine a biometric identifier received at the computing system corresponds to the user; or receive a selection of the symbol-based event from among a suite of selectable events performable using the computing system while the user is logged into the computing system.

EEE A6 is the computing system of EEE A5, wherein the login credential includes one or more from among a mobile phone number corresponding to the user, an e mail address corresponding to the user, a biometric identifier corresponding to the user, a globally unique identifier corresponding to the user, a password assigned to the user, or a confirmation from a multi factor authentication application.

EEE A7 is the computing system of any one of EEE A1 to A6, wherein the first update indicates whether the personal bank is active or inactive for the first instance of performing the symbol-based event.

EEE A8 is the computing system of any one of EEE A1 to A7, wherein the first update indicates the personal bank is inactive if the first activation request includes a free activation request.

EEE A9 is the computing system of any one of EEE A1 to A7, wherein the first update indicates the personal bank is active if the first activation request is conditioned on the computing system receiving a payment to perform the first instance of the symbol-based event.

EEE A10 is the computing system of any one of EEE A1 to A9, wherein the first update indicates the personal bank value.

EEE A11 is the computing system of any one of EEE A1 to A10, wherein the first activation request includes a symbol arrangement request.

EEE A12 is the computing system of EEE A11, wherein the symbol arrangement request comprises a symbol spin request.

EEE A13 is the computing system of any one of EEE A1 to A12, wherein the machine-readable instructions to determine the first result include machine-readable instructions to perform one or more from among: determine whether the computing system is operating in a state in which a bank incrementing feature is disabled; determine whether the set of symbols selected for the first instance of the symbol-based event includes a symbol pattern win; determine whether to output a progressive bank award; or determine whether to increment the personal bank value.

EEE A14 is the computing system of EEE A13, wherein the progressive bank award comprises an award proportional to the personal bank value corresponding to the user.

EEE A15 is the computing system of any one of EEE A13 to A14, wherein the progressive bank award is based upon one or more from among the personal bank value, a portion of the personal bank value, or a multiple of the personal bank value.

EEE A16 is the computing system of any one of EEE A1 to A15, wherein the machine-readable instructions to output the second update to the GUI include machine-readable instructions to perform one or more from among: output, in a symbol-display-portion of the GUI, an animation showing a rearranging of symbols and at least a portion of the animation stopping within the set of symbols selected for the first instance of the symbol-based event displayed in the symbol-display-portion; output an indication of a winning outcome based on a particular pattern of symbols landing within the symbol-display-portion; output an indication that a winning outcome based on particular patterns of symbols did not occur; output an indication of an award earned for a winning outcome displayed in the symbol-display-portion; outputting user guidance indicating how to use the computing system to be eligible for increasing the personal bank value; or output user guidance indicating how to use the computing system to be eligible to win an award based upon the personal bank value.

EEE A17 is the computing system of EEE A16, wherein the symbol-display-portion is arranged as a set of multiple reels; and wherein the animation showing a rearranging of symbols includes an animation showing the set of multiple reels spinning within the symbol-display-portion.

EEE A18 is the computing system of any one of EEE A16 to A17, wherein the particular pattern of symbols landing within the symbol-display-portion include a particular payline or a particular pay way.

EEE A19 is the computing system of any one of EEE A1 to A18, wherein the GUI includes a symbol-display-portion.

EEE A20 is the computing system of any one of EEE A1 to A19, wherein a portion of the GUI is arranged as a user-selectable control (USC), and the processor is further configured by the machine-readable instructions to: deactivate the user-selectable control in response to the first activation request, and reactivate the user-selectable control in temporal proximity to when the processor outputs the second update to the GUI.

EEE A21 is the computing system of EEE A20, wherein the user-selectable control is embodied within the GUI.

EEE A22 is the computing system of EEE A20, wherein the user-selectable control is embodied within hardware remote from the GUI.

EEE A23 is the computing system of any one of EEE A20 to A22, wherein the USC includes one or more from among: a USC to initiate first activation request, a USC to spin reels, a USC to increment number of active paylines, a USC to increment number of active payways, a USC to decrement number of active paylines, a USC to decrement number of active payways, a USC to increment payment per payline or payway, a USC to decrement payment per payline or payway, a USC to increment token value, a USC to decrement token value, or a USC to select quantity of multiple automatic activation requests.

EEE A24 is the computing system of any one of EEE A20 to A23, wherein the temporal proximity is immediately prior to outputting the second update, at a same time as outputting second update, or immediately after outputting a second update.

EEE A25 is the computing system of EEE A24, wherein immediately prior to or immediately after is between 0 and 250 microseconds.

EEE A26 is the computing system of EEE A24, wherein immediately prior to or immediately after is between 0 and 100 microseconds.

EEE A27 is the computing system of any one of EEE A1 to A26, wherein the processor is further configured by machine-readable instructions to: output, in response to the first activation request, a particular audio signal if the first result of performing the first instance of the symbol-based event includes a winning outcome.

EEE A28 is the computing system of any one of EEE A1 to A27, wherein the processor is further configured by the machine-readable instructions to read from and/or write to a computer-readable memory of the computing system to perform multiple operations for a series of instances of the symbol-based event, and the operations pertain to one or more from among the personal bank value corresponding to the user or providing a progressive award based on the personal bank value corresponding to the user.

EEE A29 is the computing system of EEE A28, wherein an operation of the multiple operations includes one or more from among: increasing the personal bank value corresponding to the user, resetting the personal bank value corresponding to the user to a default value, or freezing the personal bank value corresponding to the user.

EEE A30 is the computing system of EEE A28, wherein the personal bank value corresponding to the user is contained within a personal bank designated in the computer-readable memory.

EEE A31 is the computing system of EEE A28, wherein an operation performed for an earlier instance of the series is configured to impact a result of a later instance of the series.

EEE A32 is the computing system of any one of EEE A1 to A31, wherein: the machine-readable instructions to determine the first result of performing the first instance of the symbol-based event include machine-readable instructions to determine a subset of symbols randomly selected from a set of symbols for displaying in a particular arrangement within a symbol-display-portion of the GUI, the set of symbols includes multiple instances of a particular symbol, and the first result includes: an award payable to the user if a number of instances of the particular symbol in the subset of symbols is greater than or equal to a first threshold number, or an increase to the personal bank value corresponding to the user if the number of instances of the particular symbol in the subset of symbols is greater than or equal to a second threshold number and less than the first threshold number.

EEE A33 is the computing system of EEE A32, wherein each symbol in the set of symbols is represented numerically within the set of symbols; and wherein each symbol in the set of symbols corresponds to a graphical image displayable in the symbol-display-portion.

EEE A34 is the computing system of EEE A32, wherein determining the first result of performing the first instance of the symbol-based event further includes determining whether the subset of symbols displayed according to the particular arrangement includes a particular pattern of symbols defined as a winning pattern; wherein the processor is further configured by machine-readable instructions to output an award if the subset of symbols displayed according to the particular arrangement includes the particular pattern of symbols defined as the winning pattern; wherein the particular patter of symbols includes a payline or a pay way.

EEE A35 is the computing system of any one of EEE A1 to A34, wherein the computing system is configured to interface with multiple computing devices to perform different instances of the symbol-based event with reference to the personal bank value corresponding to the user.

EEE A36 is the computing system of any one of EEE A1 to A35, wherein the processor is further configured by machine-readable instructions to: determine, in response to a second activation request, a second result of performing a second instance of the symbol-based event, the second result indicating whether to change the personal bank value based on a second set of symbols selected for the second instance of the symbol-based event; and output, to the display in response to the second activation request, a second update to the GUI, the second update including at least the second result of performing the second instance of the symbol-based event.

EEE A37 is the computing system of EEE A36, wherein the second activation request occurs after the first activation request and the first instance of the symbol-based event.

EEE A38 is the computing system of EEE A36, wherein the second activation request occurs before the first activation request and the first instance of the symbol-based event.

EEE A39 is the computing system of any one of EEE A1 to A38, wherein the processor is further configured by machine-readable instructions to: determine one or more other results of performing one or more other instances of the symbol-based event after determining the trigger event and prior to the determining the first result in response to the first activation request.

EEE B1 is a method comprising: outputting a graphical user interface (GUI) to a display of a computing system configured to perform a symbol-based event; determining a trigger event corresponding to a user accessing the symbol-based event at the computing system; outputting, to the display a first update to the GUI, the first update based on a personal bank value corresponding to the user; determining, in response to a first activation request, a first result of performing a first instance of the symbol-based event, the first result indicating whether to change the personal bank value based on a set of symbols selected for the first instance of the symbol-based event; and outputting, to the display in response to the first activation request, a second update to the GUI, the second update including at least the first result of performing the first instance of the symbol-based event.

EEE B2 is the method of EEE B1, wherein the personal bank value equals a predefined default value if performing the first instance of the symbol-based event includes performing an initial instance of the symbol-based event for the user, or the personal bank value is based on a respective result of performing one or more instances of the symbol-based event for the user prior to performing the first instance of the symbol-based event if performing the first instance of the symbol-based event includes performing an instance of the symbol-based event for the user after performing the initial instance of the symbol-based event for the user.

EEE B3 is the method of any one of EEE B1 to B2, further comprising: establishing, by the computing system within a computer-readable memory, a personal bank corresponding to the user, wherein the personal bank includes the personal bank value corresponding to the user and a user identifier associated with the user; reading the computer-readable memory to determine the personal bank value; and writing to the computer-readable memory to change the personal bank value EEE B4 is the method of EEE B3, wherein the user identifier associated with the user is configured as metadata corresponding to the personal bank.

EEE B5 is the method of any one of EEE B1 to B4, wherein determining the trigger event includes one or more from among the following: determining a login credential received at the computing system corresponds to the user; determining a casino card corresponding to the user was swiped through a card reader corresponding to the computing system; determining a biometric identifier received at the computing system corresponds to the user; or receiving a selection of the symbol-based event from among a suite of selectable events performable using the computing system while the user is logged into the computing system.

EEE B6 is the method of EEE B5, wherein the login credential includes one or more from among a mobile phone number corresponding to the user, an e mail address corresponding to the user, a biometric identifier corresponding to the user, a globally unique identifier corresponding to the user, a password assigned to the user, or a confirmation from a multi factor authentication application.

EEE B7 is the method of any one of EEE B1 to B6, wherein the first update indicates whether the personal bank is active or inactive for the first instance of performing the symbol-based event.

EEE B8 is the method of any one of EEE B1 to B7, wherein the first update indicates the personal bank is inactive if the first activation request includes a free activation request.

EEE B9 is the method of any one of EEE B1 to B7, wherein the first update indicates the personal bank is active if the first activation request is conditioned on the computing system receiving a payment to perform the first instance of the symbol-based event.

EEE B10 is the method of any one of EEE B1 to B9, wherein the first update indicates the personal bank value.

EEE B11 is the method of EEE any one of B1 to B10, wherein the first activation request includes a symbol arrangement request.

EEE B12 is the method of EEE B11, wherein the symbol arrangement request comprises a symbol spin request.

EEE B13 is the method of any one of EEE B1 to B12, wherein determining the first result includes one or more from among: determining whether the computing system is operating in a state in which a bank incrementing feature is disabled; determining whether the set of symbols selected for the first instance of the symbol-based event includes a symbol pattern win; determining whether to output a progressive bank award; or determining whether to increment the personal bank value.

EEE B14 is the method of EEE B13, wherein the progressive bank award comprises an award proportional to the personal bank value corresponding to the user.

EEE B15 is the method of any one of EEE B13 to B14, wherein the progressive bank award is based upon one or more from among the personal bank value, a portion of the personal bank value, or a multiple of the personal bank value.

EEE B16 is the method of any one of EEE B1 to B15, wherein outputting the second update to the GUI further includes outputting, in a symbol-display-portion of the GUI, an animation showing a rearranging of symbols and at least a portion of the animation stopping within the set of symbols selected for the first instance of the symbol-based event displayed in the symbol-display-portion; wherein outputting the second update to the GUI further includes outputting an indication of a winning outcome based on a particular pattern of symbols landing within the symbol-display-portion; wherein outputting the second update to the GUI further includes outputting an indication that a winning outcome based on particular patterns of symbols did not occur; wherein outputting the second update to the GUI further includes outputting an indication of an award earned for a winning outcome displayed in the symbol-display-portion; wherein outputting the second update to the GUI further includes outputting user guidance indicating how to use the computing system to be eligible for increasing the personal bank value; or wherein outputting the second update to the GUI further includes outputting user guidance indicating how to use the computing system to be eligible to win an award based upon the personal bank value.

EEE B17 is the method of EEE B16, wherein the symbol-display-portion is arranged as a set of multiple reels; and wherein the animation showing a rearranging of symbols includes an animation showing the set of multiple reels spinning within the symbol-display-portion.

EEE B18 is the method of any one of EEE B16 to B17, wherein the particular pattern of symbols landing within the symbol-display-portion include a particular payline or a particular pay way.

EEE B19 is the method of any one of EEE B1 to B18, wherein the GUI includes a symbol-display-portion.

EEE B20 is the method of any one of EEE B1 to B19, wherein a portion of the GUI is arranged as a user-selectable control (USC), and the processor is further configured by the machine-readable instructions to: deactivate the user-selectable control in response to the first activation request, and reactivate the user-selectable control in temporal proximity to when the processor outputs the second update to the GUI.

EEE B21 is the method of EEE B20, wherein the user-selectable control is embodied within the GUI.

EEE B22 is the method of EEE B20, wherein the user-selectable control is embodied within hardware remote from the GUI.

EEE B23 is the method of any one of EEE B20 to B22, wherein the USC includes one or more from among: a USC to initiate first activation request, a USC to spin reels, a USC to increment number of active paylines, a USC to increment number of active payways, a USC to decrement number of active paylines, a USC to decrement number of active payways, a USC to increment payment per payline or payway, a USC to decrement payment per payline or payway, a USC to increment token value, a USC to decrement token value, or a USC to select quantity of multiple automatic activation requests.

EEE B24 is the method of any one of EEE B20 to B23, wherein the temporal proximity is immediately prior to outputting the second update, at a same time as outputting second update, or immediately after outputting a second update.

EEE B25 is the method of EEE B24, wherein immediately prior to or immediately after is between 0 and 250 microseconds.

EEE B26 is the method of EEE B24, wherein immediately prior to or immediately after is between 0 and 100 microseconds.

EEE B27 is the method of any one of EEE B1 to B26, further comprising: outputting, in response to the first activation request, a particular audio signal if the first result of performing the first instance of the symbol-based event includes a winning outcome.

EEE B28 is the method of any one of EEE B1 to B27, further comprising: reading from and/or writing to a computer-readable memory of the computing system for performing multiple operations for a series of instances of the symbol-based event; wherein the operations pertain to one or more from among the personal bank value corresponding to the user or providing a progressive award based on the personal bank value corresponding to the user.

EEE B29 is the method of EEE B28, wherein an operation of the multiple operations includes increasing the personal bank value corresponding to the user, wherein an operation of the multiple operations includes resetting the personal bank value corresponding to the user to a default value, and/or wherein an operation of the multiple operations includes freezing the personal bank value corresponding to the user.

EEE B30 is the method of EEE B28, wherein the personal bank value corresponding to the user is contained within a personal bank designated in the computer-readable memory.

EEE B31 is the method of EEE B28, wherein an operation performed for an earlier instance of the series is configured to impact a result of a later instance of the series.

EEE B32 is the method of any one of EEE B1 to B31, wherein determining the first result of performing the first instance of the symbol-based event includes determining a subset of symbols randomly selected from a set of symbols for displaying in a particular arrangement within a symbol-display-portion of the GUI; the set of symbols includes multiple instances of a particular symbol; and the first result includes: an award payable to the user if a number of instances of the particular symbol in the subset of symbols is greater than or equal to a first threshold number, or an increase to the personal bank value corresponding to the user if the number of instances of the particular symbol in the subset of symbols is greater than or equal to a second threshold number and less than the first threshold number.

EEE B33 is the method of EEE B32, wherein each symbol in the set of symbols is represented numerically within the set of symbols; and wherein each symbol in the set of symbols corresponds to a graphical image displayable in the symbol-display-portion.

EEE B34 is the method of EEE B32, wherein determining the first result of performing the first instance of the symbol-based event further includes determining whether the subset of symbols displayed according to the particular arrangement includes a particular pattern of symbols defined as a winning pattern; outputting an award if the subset of symbols displayed according to the particular arrangement includes the particular pattern of symbols defined as the winning pattern; and wherein the particular patter of symbols includes a payline or a pay way.

EEE B35 is the method of any one of EEE B1 to B34, wherein the computing system is configured to interface with multiple computing devices to perform different instances of the symbol-based event with reference to the personal bank value corresponding to the user.

EEE B36 is the method of any one of EEE B1 to B35, further comprising: determining, in response to a second activation request, a second result of performing a second instance of the symbol-based event, the second result indicating whether to change the personal bank value based on a second set of symbols selected for the second instance of the symbol-based event; and outputting, to the display in response to the second activation request, a second update to the GUI, the second update including at least the second result of performing the second instance of the symbol-based event.

EEE B37 is the method of EEE B36, wherein the second activation request occurs after the first activation request and the first instance of the symbol-based event.

EEE B38 is the method of EEE B36, wherein the second activation request occurs before the first activation request and the first instance of the symbol-based event.

EEE B39 is the method of any one of EEE B1 to B38, further comprising: determining one or more other results of performing one or more other instances of the symbol-based event after determining the trigger event and prior to the determining the first result in response to the first activation request.

EEE C1 is a computer-readable memory having stored therein instructions executable by a processor to cause a computing system to perform functions comprising: outputting a graphical user interface (GUI) to a display of a computing system configured to perform a symbol-based event; determining a trigger event corresponding to a user accessing the symbol-based event at the computing system; outputting, to the display a first update to the GUI, the first update based on a personal bank value corresponding to the user; determining, in response to a first activation request, a first result of performing a first instance of the symbol-based event, the first result indicating whether to change the personal bank value based on a set of symbols selected for the first instance of the symbol-based event; and outputting, to the display in response to the first activation request, a second update to the GUI, the second update including at least the first result of performing the first instance of the symbol-based event.

EEE C2 is the computer-readable memory of EEE C1, wherein the personal bank value equals a predefined default value if performing the first instance of the symbol-based event includes performing an initial instance of the symbol-based event for the user, or the personal bank value is based on a respective result of performing one or more instances of the symbol-based event for the user prior to performing the first instance of the symbol-based event if performing the first instance of the symbol-based event includes performing an instance of the symbol-based event for the user after performing the initial instance of the symbol-based event for the user.

EEE C3 is the computer-readable memory of any one of EEE C1 to C2, wherein the functions further comprise: establishing, within the computer-readable memory, a personal bank corresponding to the user, wherein the personal bank includes the personal bank value corresponding to the user and a user identifier associated with the user; reading the computer-readable memory to determine the personal bank value; and writing to the computer-readable memory to change the personal bank value.

EEE C4 is the computer-readable memory of EEE C3, wherein the user identifier associated with the user is configured as metadata corresponding to the personal bank.

EEE C5 is the computer-readable memory of any one of EEE C1 to C4, wherein determining the trigger event includes one or more from among the following: determining a login credential received at the computing system corresponds to the user; determining a casino card corresponding to the user was swiped through a card reader corresponding to the computing system; determining a biometric identifier received at the computing system corresponds to the user; or receiving a selection of the symbol-based event from among a suite of selectable events performable using the computing system while the user is logged into the computing system.

EEE C6 is the computer-readable memory of EEE C5, wherein the login credential includes one or more from among a mobile phone number corresponding to the user, an e mail address corresponding to the user, a biometric identifier corresponding to the user, a globally unique identifier corresponding to the user, a password assigned to the user, or a confirmation from a multi factor authentication application.

EEE C7 is the computer-readable memory of any one of EEE C1 to C6, wherein the first update indicates whether the personal bank is active or inactive for the first instance of performing the symbol-based event.

EEE C8 is the computer-readable memory of any one of EEE C1 to C7, wherein the first update indicates the personal bank is inactive if the first activation request includes a free activation request.

EEE C9 is the computer-readable memory of any one of EEE C1 to C7, wherein the first update indicates the personal bank is active if the first activation request is conditioned on the computing system receiving a payment to perform the first instance of the symbol-based event.

EEE C10 is the computer-readable memory of any one of EEE C1 to C9, wherein the first update indicates the personal bank value.

EEE C11 is the computer-readable memory of any one of EEE C1 to C10, wherein the first activation request includes a symbol arrangement request.

EEE C12 is the computer-readable memory of EEE C11, wherein the symbol arrangement request comprises a symbol spin request.

EEE C13 is the computer-readable memory of any one of EEE C1 to C12, wherein determining the first result comprises determining whether the computing system is operating in a state in which a bank incrementing feature is disabled; wherein determining the first result comprises determining whether the first result includes a symbol pattern win; wherein determining the first result comprises determining whether the first result includes a progressive bank award; or wherein determining the first result comprises determining whether to increment the personal bank value.

EEE C14 is the computer-readable memory of EEE C13, wherein the progressive bank award comprises an award proportional to the personal bank value corresponding to the user.

EEE C15 is the computer-readable memory of any one of EEE C13 to C14, wherein the progressive bank award is based upon one or more from among the personal bank value, a portion of the personal bank value, or a multiple of the personal bank value.

EEE C16 is the computer-readable memory of any one of EEE C1 to C15, wherein outputting the second update to the GUI further includes performing one or more from among: outputting, in a symbol-display-portion of the GUI, an animation showing a rearranging of symbols and at least a portion of the animation stopping within the set of symbols selected for the first instance of the symbol-based event displayed in the symbol-display-portion; outputting an indication of a winning outcome based on a particular pattern of symbols landing within the symbol-display-portion; outputting an indication that a winning outcome based on particular patterns of symbols did not occur; outputting an indication of an award earned for a winning outcome displayed in the symbol-display-portion; outputting user guidance indicating how to use the computing system to be eligible for increasing the personal bank value; or outputting user guidance indicating how to use the computing system to be eligible to win an award based upon the personal bank value.

EEE C17 is the computer-readable memory of EEE C16, wherein the symbol-display-portion is arranged as a set of multiple reels; and wherein the animation showing a rearranging of symbols includes an animation showing the set of multiple reels spinning within the symbol-display-portion.

EEE C18 is the computer-readable memory of any one of EEE C16 to C17, wherein the particular pattern of symbols landing within the symbol-display-portion include a particular payline or a particular pay way.

EEE C19 is the computer-readable memory of any one of EEE C1 to C18, wherein the GUI includes a symbol-display-portion.

EEE C20 is the computer-readable memory of any one of EEE C1 to C19, wherein a portion of the GUI is arranged as a user-selectable control (USC), and the processor is further configured by the machine-readable instructions to: deactivate the user-selectable control in response to the first activation request, and reactivate the user-selectable control in temporal proximity to when the processor outputs the second update to the GUI.

EEE C21 is the computer-readable memory of EEE C20, wherein the user-selectable control is embodied within the GUI.

EEE C22 is the computer-readable memory of EEE C20, wherein the user-selectable control is embodied within hardware remote from the GUI.

EEE C23 is the computer-readable memory of any one of EEE C20 to C22, wherein the USC includes one or more from among: a USC to initiate first activation request, a USC to spin reels, a USC to increment number of active paylines, a USC to increment number of active payways, a USC to decrement number of active paylines, a USC to decrement number of active payways, a USC to increment payment per payline or payway, a USC to decrement payment per payline or payway, a USC to increment token value, a USC to decrement token value, or a USC to select quantity of multiple automatic activation requests.

EEE C24 is the computer-readable memory of any one of EEE C20 to C23, wherein the temporal proximity is immediately prior to outputting the second update, at a same time as outputting second update, or immediately after outputting a second update.

EEE C25 is the computer-readable memory of EEE C24, wherein immediately prior to or immediately after is between 0 and 250 microseconds.

EEE C26 is the computer-readable memory of EEE C24, wherein immediately prior to or immediately after is between 0 and 100 microseconds.

EEE C27 is the computer-readable memory of any one of EEE C1 to C26, wherein the functions further comprise: outputting, in response to the first activation request, a particular audio signal if the first result of performing the first instance of the symbol-based event includes a winning outcome.

EEE C28 is the computer-readable memory of any one of EEE C1 to C27, wherein the functions further comprise: reading from and/or writing to a computer-readable memory of the computing system for performing multiple operations for a series of instances of the symbol-based event; wherein the operations pertain to one or more from among the personal bank value corresponding to the user or providing a progressive award based on the personal bank value corresponding to the user.

EEE C29 is the computer-readable memory of EEE C28, wherein an operation of the multiple operations includes increasing the personal bank value corresponding to the user, wherein an operation of the multiple operations includes resetting the personal bank value corresponding to the user to a default value, and/or wherein an operation of the multiple operations includes freezing the personal bank value corresponding to the user.

EEE C30 is the computer-readable memory of EEE C28, wherein the personal bank value corresponding to the user is contained within a personal bank designated in the computer-readable memory.

EEE C31 is the computer-readable memory of EEE C28, wherein an operation performed for an earlier instance of the series is configured to impact a result of a later instance of the series.

EEE C32 is the computer-readable memory of any one of EEE C1 to C31, wherein determining the first result of performing the first instance of the symbol-based event includes determining a subset of symbols randomly selected from a set of symbols for displaying in a particular arrangement within a symbol-display-portion of the GUI; the set of symbols includes multiple instances of a particular symbol; and the first result includes: an award payable to the user if a number of instances of the particular symbol in the subset of symbols is greater than or equal to a first threshold number, or an increase to the personal bank value corresponding to the user if the number of instances of the particular symbol in the subset of symbols is greater than or equal to a second threshold number and less than the first threshold number.

EEE C33 is the computer-readable memory of EEE C32, wherein each symbol in the set of symbols is represented numerically within the set of symbols; and wherein each symbol in the set of symbols corresponds to a graphical image displayable in the symbol-display-portion.

EEE C34 is the computer-readable memory of EEE C32, wherein determining the first result of performing the first instance of the symbol-based event further includes determining whether the subset of symbols displayed according to the particular arrangement includes a particular pattern of symbols defined as a winning pattern; wherein the method outputting an award if the subset of symbols displayed according to the particular arrangement includes the particular pattern of symbols defined as the winning pattern; and wherein the particular patter of symbols includes a payline or a pay way.

EEE C35 is the computer-readable memory of any one of EEE C1 to C34, wherein the computing system is configured to interface with multiple computing devices to perform different instances of the symbol-based event with reference to the personal bank value corresponding to the user.

EEE C36 is the computer-readable memory of any one of EEE C1 to C35, wherein the functions further comprise: determining, in response to a second activation request, a second result of performing a second instance of the symbol-based event, the second result indicating whether to change the personal bank value based on a second set of symbols selected for the second instance of the symbol-based event; and outputting, to the display in response to the second activation request, a second update to the GUI, the second update including at least the second result of performing the second instance of the symbol-based event.

EEE C37 is the computer-readable memory of EEE C36, wherein the second activation request occurs after the first activation request and the first instance of the symbol-based event.

EEE C38 is the computer-readable memory of EEE C36, wherein the second activation request occurs before the first activation request and the first instance of the symbol-based event.

EEE C39 is the computer-readable memory of any one of EEE C1 to C38, wherein the functions further comprise: determining one or more other results of performing one or more other instances of the symbol-based event after determining the trigger event and prior to the determining the first result in response to the first activation request.

The invention claimed is:

1. A server-side computing system comprising:

a processor configured by machine-readable instructions to:

securely authenticate a user using a multi-factor authentication application to establish an authenticated user for a symbol-based event, wherein secure authentication of the user occurs over a distributed computing system that includes the server-side computing system and a client-side computing system, and wherein a graphical user interface (GUI) for the symbol-based event is output to a display of the client-side computing system;

determine a trigger event corresponding to the authenticated user accessing the symbol-based event at the client-side computing system;

output, to the display a first update to the GUI, the first update based on a personal bank value corresponding to the authenticated user, wherein the server-side computing system stores multiple personal bank values for multiple users;

determine, in response to a first activation request, a first result of performing a first instance of the symbol-based event, the first result indicating a change to the personal bank value corresponding to the authenticated user, wherein the change is based on a set of symbols selected for the first instance of the symbol-based event, and wherein the GUI is changed to reflect the change in the personal bank value corresponding to the authenticated user; and output, to the display in response to the first activation request, a second update to the GUI, the second update including at least the first result of performing the first instance of the symbol-based event.

2. The server-side computing system of claim 1, wherein:

the personal bank value equals a predefined default value if performing the first instance of the symbol-based event includes performing an initial instance of the symbol-based event for the authenticated user, or the personal bank value is based on a respective result of performing one or more instances of the symbol-based event for the authenticated user prior to performing the first instance of the symbol-based event if performing the first instance of the symbol-based event includes performing an instance of the symbol-based event for the authenticated user after performing the initial instance of the symbol-based event for the authenticated user.

3. The server-side computing system of claim 1, wherein the processor is further configured by machine-readable instructions to:

establish, by the server-side computing system within a computer-readable memory, a personal bank corresponding to the authenticated user, wherein the personal bank includes the personal bank value corresponding to the authenticated user and a user identifier associated with the authenticated user;

read the computer-readable memory to determine the personal bank value; and write to the computer-readable memory to change the personal bank value.

4. The server-side computing system of claim 1, wherein the machine-readable instructions to determine the first result include machine-readable instructions to perform one or more from among:

determine whether the server-side computing system is operating in a state in which a bank incrementing feature is disabled;

determine whether the set of symbols selected for the first instance of the symbol-based event includes a symbol pattern win;

determine whether to output a progressive bank award; or determine whether to increment the personal bank value.

5. The server-side computing system of claim 1, wherein:

a portion of the GUI is arranged as a user-selectable control, and the processor is further configured by the machine-readable instructions to:

deactivate the user-selectable control in response to the first activation request, and reactivate the user-selectable control in temporal proximity to when the processor outputs the second update to the GUI.

6. The server-side computing system of claim 1 further comprising:

a hardware user-selectable control operatively coupled to an input of the processor, wherein the processor is further configured by the machine-readable instructions to:

disable reading the input in response to the first activation request, and re-enable reading the input in temporal proximity to when the processor outputs the second update to the GUI.

7. The server-side computing system of claim 1, wherein the machine-readable instructions to output the second update to the GUI include machine-readable instructions to perform one or more from among:

output, in a symbol-display-portion of the GUI, an animation showing a rearranging of symbols and at least a portion of the animation stopping within the set of symbols selected for the first instance of the symbol-based event displayed in the symbol-display-portion;

output an indication of a winning outcome based on a particular pattern of symbols landing within the symbol-display-portion;

output an indication that a winning outcome based on particular patterns of symbols did not occur;

output an indication of an award earned for a winning outcome displayed in the symbol-display-portion;

outputting user guidance indicating how to use the client-side computing system to be eligible for increasing the personal bank value; or output user guidance indicating how to use the client-side computing system to be eligible to win an award based upon the personal bank value.

8. The server-side computing system of claim 1, wherein:

the processor is further configured by the machine-readable instructions to read from and/or write to a computer-readable memory of the server-side computing system to perform multiple operations for a series of instances of the symbol-based event, and the operations pertain to one or more from among the personal bank value corresponding to the authenticated user or providing a progressive award based on the personal bank value corresponding to the authenticated user.

9. The server-side computing system of claim 8, wherein an operation of the multiple operations includes one or more from among:

increasing the personal bank value corresponding to the authenticated user, resetting the personal bank value corresponding to the authenticated user to a default value, or freezing the personal bank value corresponding to the authenticated user.

10. The server-side computing system of claim 1, wherein:

the machine-readable instructions to determine the first result of performing the first instance of the symbol-based event include machine-readable instructions to determine a subset of symbols randomly selected from a set of symbols for displaying in a particular arrangement within a symbol-display-portion of the GUI, the set of symbols includes multiple instances of a particular symbol, and the first result includes:

an award payable to the authenticated user if a number of instances of the particular symbol in the subset of symbols is greater than or equal to a first threshold number, or an increase to the personal bank value corresponding to the authenticated user if the number of instances of the particular symbol in the subset of symbols is greater than or equal to a second threshold number and less than the first threshold number.

11. The server-side computing system of claim 1, wherein the server-side computing system is configured to interface with multiple computing devices to perform different instances of the symbol-based event with reference to the personal bank value corresponding to the authenticated user.

12. A method comprising:

securely authenticating a user using a multi-factor authentication application to establish an authenticated user for a symbol-based event, wherein secure authentication of the user occurs over a distributed computing system that includes a server-side computing system and a client-side computing system, and wherein a graphical user interface (GUI) for the symbol-based event is output to a display of the client-side computing system;

determining a trigger event corresponding to the authenticated user accessing the symbol-based event at the client-side computing system;

outputting, to the display, a first update to the GUI, the first update based on a personal bank value corresponding to the authenticated user, wherein the server-side computing system stores multiple personal bank values for multiple users;

determining, in response to a first activation request, a first result of performing a first instance of the symbol-based event, the first result indicating a whether to change to the personal bank value corresponding to the authenticated user, wherein the change is based on a set of symbols selected for the first instance of the symbol-based event, and wherein the GUI is changed to reflect the change in the personal bank value corresponding to the authenticated user; and outputting, to the display in response to the first activation request, a second update to the GUI, the second update including at least the first result of performing the first instance of the symbol-based event.

13. The server-side computing system of claim 1, wherein the server-side computing system and the client-side computing system are configured to use a multi-factor authentication application to securely authenticate the user and provide authentication confirmation.

14. The method of claim 12, further comprising:

establishing, by the server-side computing system within a computer-readable memory, a personal bank corresponding to the authenticated user, wherein the personal bank includes the personal bank value corresponding to the authenticated user and a user identifier associated with the authenticated user;

reading the computer-readable memory to determine the personal bank value; and writing to the computer-readable memory to change the personal bank value.

15. The method of claim 12, wherein determining the first result includes one or more from among:

determining whether the server-side computing system is operating in a state in which a bank incrementing feature is disabled;

determining whether the set of symbols selected for the first instance of the symbol-based event includes a symbol pattern win;

determining whether to output a progressive bank award; or determining whether to increment the personal bank value.

16. The method of claim 12, wherein:

determining the first result of performing the first instance of the symbol-based event includes determining a subset of symbols randomly selected from a set of symbols for displaying in a particular arrangement within a symbol-display-portion of the GUI;

the set of symbols includes multiple instances of a particular symbol; and the first result includes:

an award payable to the authenticated user if a number of instances of the particular symbol in the subset of symbols is greater than or equal to a first threshold number, or an increase to the personal bank value corresponding to the authenticated user if the number of instances of the particular symbol in the subset of symbols is greater than or equal to a second threshold number and less than the first threshold number.

17. A computer-readable memory having stored therein instructions executable by a processor to cause a computing system to perform functions comprising:

securely authenticating a user using a multi-factor authentication application to establish an authenticated user for a symbol-based event, wherein secure authentication of the user occurs over a distributed computing system that includes a server-side computing system and a client-side computing system, and wherein a graphical user interface (GUI) for the symbol-based event is output to a display of the client-side computing system;

determining a trigger event corresponding to the authenticated user accessing the symbol-based event at the client-side computing system;

outputting, to the display a first update to the GUI, the first update based on a personal bank value corresponding to the authenticated user, wherein the server-side computing system stores multiple personal bank values for multiple users;

determining, in response to a first activation request, a first result of performing a first instance of the symbol-based event, the first result indicating a whether to change to the personal bank value corresponding to the authenticated user, wherein the change is based on a set of symbols selected for the first instance of the symbol-based event, and wherein the GUI is changed to reflect the change in the personal bank value corresponding to the authenticated user; and outputting, to the display in response to the first activation request, a second update to the GUI, the second update including at least the first result of performing the first instance of the symbol-based event.

18. The computer-readable memory of claim 17, wherein the functions further comprise:

establishing, within the computer-readable memory, a personal bank corresponding to the authenticated user, wherein the personal bank includes the personal bank value corresponding to the authenticated user and a user identifier associated with the authenticated user;

reading the computer-readable memory to determine the personal bank value; and writing to the computer-readable memory to change the personal bank value.

19. The computer-readable memory of claim 17, wherein outputting the second update to the GUI further includes performing one or more from among:

outputting, in a symbol-display-portion of the GUI, an animation showing a rearranging of symbols and at least a portion of the animation stopping within the set of symbols selected for the first instance of the symbol-based event displayed in the symbol-display-portion;

outputting an indication of a winning outcome based on a particular pattern of symbols landing within the symbol-display-portion;

outputting an indication that a winning outcome based on particular patterns of symbols did not occur;

outputting an indication of an award earned for a winning outcome displayed in the symbol-display-portion;

outputting user guidance indicating how to use the computing system to be eligible for increasing the personal bank value; or outputting user guidance indicating how to use the computing system to be eligible to win an award based upon the personal bank value.

20. The computer-readable memory of claim 17, wherein:

determining the first result of performing the first instance of the symbol-based event includes determining a subset of symbols randomly selected from a set of symbols for displaying in a particular arrangement within a symbol-display-portion of the GUI;

the set of symbols includes multiple instances of a particular symbol; and the first result includes:

an award payable to the authenticated user if a number of instances of the particular symbol in the subset of symbols is greater than or equal to a first threshold number, or an increase to the personal bank value corresponding to the authenticated user if the number of instances of the particular symbol in the subset of symbols is greater than or equal to a second threshold number and less than the first threshold number.

* * * * *